| (12) United States Patent<br>Shimomoto | (10) Patent No.: US 10,237,210 B2<br>(45) Date of Patent: Mar. 19, 2019 |
|---|---|

(54) INFORMATION PROCESSING SYSTEM AND METHOD OF PROCESSING INFORMATION

(71) Applicant: Ryoh Shimomoto, Kanagawa (JP)

(72) Inventor: Ryoh Shimomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 488 days.

(21) Appl. No.: 14/552,868

(22) Filed: Nov. 25, 2014

(65) Prior Publication Data

US 2015/0149574 A1    May 28, 2015

(30) Foreign Application Priority Data

Nov. 27, 2013   (JP) ................................. 2013-245293
Nov. 11, 2014   (JP) ................................. 2014-228881

(51) Int. Cl.
*G06F 15/16*    (2006.01)
*H04L 12/58*    (2006.01)
*H04L 29/08*    (2006.01)
*G06F 17/30*    (2006.01)
*G06F 21/62*    (2013.01)
*G06F 21/60*    (2013.01)

(52) U.S. Cl.
CPC ........ *H04L 51/04* (2013.01); *G06F 17/30067* (2013.01); *G06F 21/606* (2013.01); *G06F 21/6218* (2013.01); *H04L 67/06* (2013.01)

(58) Field of Classification Search
CPC ..... H04L 51/04; H04L 67/06; G06F 21/6218; G06F 17/30067
USPC ......................................................... 709/206
See application file for complete search history.

(56) References Cited

U.S. PATENT DOCUMENTS

| 6,678,720 B1 | 1/2004 | Matsumoto et al. |
| 2004/0068524 A1* | 4/2004 | Aboulhosn ....... G06F 17/30206 |
| 2007/0016613 A1 | 1/2007 | Foresti et al. |

(Continued)

FOREIGN PATENT DOCUMENTS

| JP | 2001-045044 | 2/2001 |
| JP | 2005-258937 | 9/2005 |

(Continued)

OTHER PUBLICATIONS

Extended European Search Report dated Apr. 9, 2015.

(Continued)

*Primary Examiner* — Kevin T Bates
*Assistant Examiner* — Clarence D McCray
(74) *Attorney, Agent, or Firm* — IPUSA, PLLC

(57) ABSTRACT

An information processing system includes an apparatus and terminal devices, wherein a first terminal device of the terminal devices includes a first acquisition unit acquiring a file name of one file stored in the apparatus using first user information, a first send unit sending a message including the first user information and access information and directed to the second user, wherein a second terminal device of the terminal devices includes a receiving unit receiving the message from the another apparatus based on second user information, a second acquisition unit acquiring one file specified by the access information using the first user information, wherein the apparatus includes a determination unit determining whether one file is sent to the second terminal device based on the first user information and information of the user who can access one file, and a second send unit sending one file to the second terminal device.

10 Claims, 30 Drawing Sheets

(56) References Cited

U.S. PATENT DOCUMENTS

| | | | |
|---|---|---|---|
| 2007/0078938 A1* | 4/2007 | Hu | G06Q 10/107 709/206 |
| 2007/0276823 A1* | 11/2007 | Borden | G06F 17/30097 |
| 2007/0282927 A1* | 12/2007 | Polouetkov | G06F 17/30011 |
| 2009/0276471 A1* | 11/2009 | Baer | G06F 17/30011 |
| 2009/0313331 A1* | 12/2009 | Rasmussen | G06F 17/2288 709/205 |
| 2011/0185437 A1* | 7/2011 | Tran | H04L 63/104 726/28 |
| 2011/0191688 A1 | 8/2011 | Hasegawa et al. | |
| 2012/0218595 A1* | 8/2012 | Miyazawa | G06F 3/126 358/1.15 |
| 2012/0297321 A1* | 11/2012 | Douglas | H04L 51/043 715/758 |
| 2012/0331108 A1* | 12/2012 | Ferdowsi | H04L 67/06 709/219 |
| 2013/0067594 A1 | 3/2013 | Kantor et al. | |
| 2013/0212163 A1 | 8/2013 | Shimomoto | |
| 2013/0290432 A1* | 10/2013 | Oh | H04L 61/1594 709/204 |
| 2014/0082139 A1 | 3/2014 | Shimomoto | |
| 2014/0258430 A1 | 9/2014 | Choi | |
| 2015/0026261 A1 | 1/2015 | Shimakawa | |

FOREIGN PATENT DOCUMENTS

| | | |
|---|---|---|
| JP | 2011-164696 | 8/2011 |
| JP | 2013-161218 | 8/2013 |
| KR | 10-2013-0056665 | 5/2013 |
| WO | 2011/077501 | 6/2011 |
| WO | 2013/063237 | 5/2013 |
| WO | 2013/145518 | 10/2013 |
| WO | 2014/138747 | 9/2014 |

OTHER PUBLICATIONS

Anonymous: "How do I embed login credentials in a URL?", Oct. 30, 2013, Retrieved from the Internet: URL: http://help. screensteps. com/m/10207/1/3528-how-do-i- embed-login-credentials -in-a-url, Retrieved on Mar. 26, 2015.

Anonymous et al.: "Embed Password Loghound. com", Loghound. com, Dec. 31, 2012, pp. 1-2, Retrieved from the Internet: URL: http://loghound. com/lockdown/FAQ/embedpassword/index.html, Retrieved on Mar. 27, 2015.

Office Action dated Aug. 21, 2018 issued with respect to the basic Japanese Patent Application No. 2014-228881.

* cited by examiner

APPARATUS REGISTRATION

LET AN APPARATUS TO BE REGISTERED READ
TWO-DIMENSIONAL CODE

{"id":"file_storage_a","address": "192.168.0.2","file_strage_id": "file_storage_a_id",
"activate":"http://192.168.0.2/activate/user1/abcdefghijklmnopqrstuvwxyz",
"userid":"User A", "password": "01234567"}

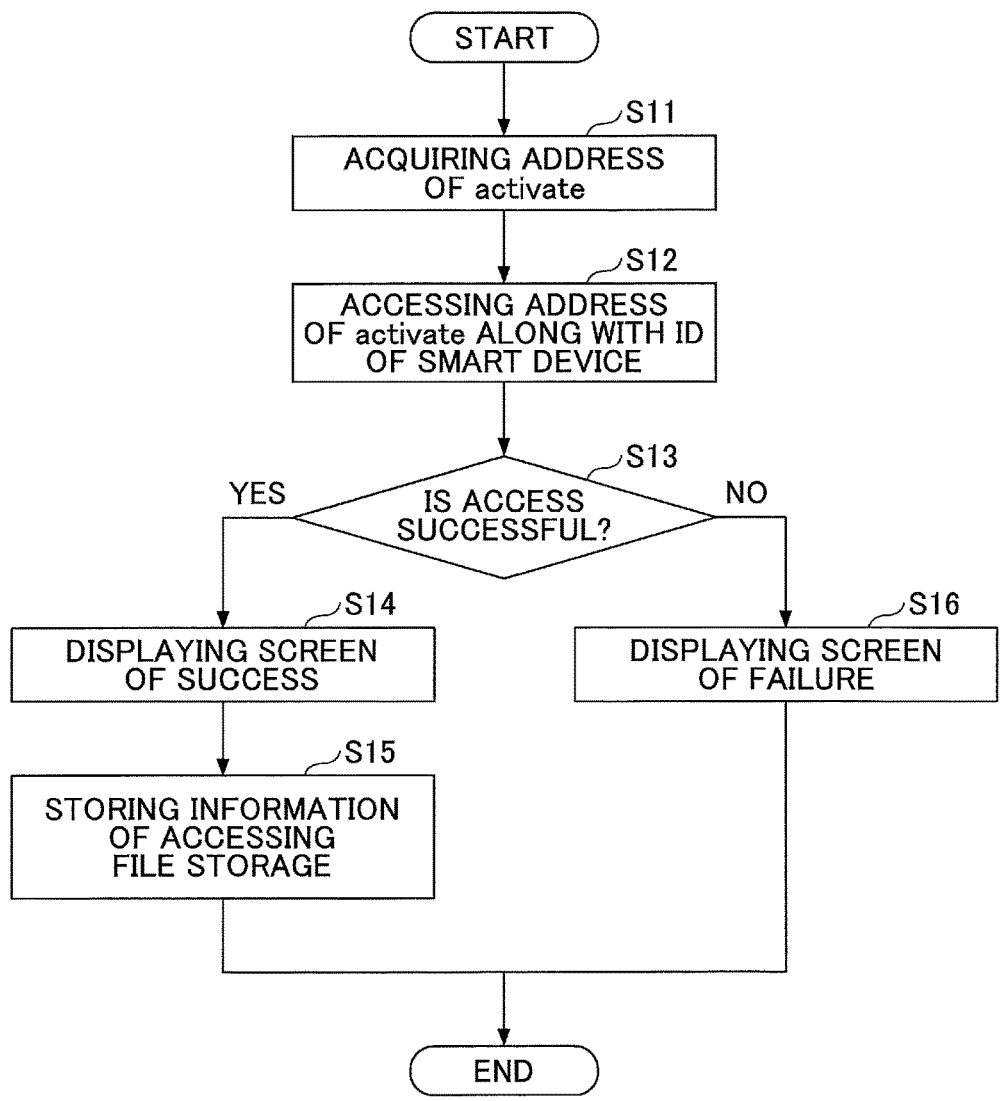

FIG.17

| GROUP NAME | USER NAME |
|---|---|
| GROUP 1 | UserA,UserB |
| GROUP 2 | UserA,UserC |
| GROUP 3 | UserA,UserB,UserC |

```
{
    "path":"/UserA/file_a",
    "userid":"User A",
    "password":"01234567",
    "storage_id":"abcdefg",
    "link_id":"ABCDEFGHIJ"
}
``` http://relay.server.com/get_file?path=/User%20A/
filea&userid=User%20A&password=01234567&storage_id=abcdefg

FIG.32

| LinkID | UserID | Password |
|---|---|---|
| ABCDEFGHIJ | UserA | 01234567 |
| ... | ... | ... |

FIG.33

```
{
    "path":"/UserA/file_a",
    "storage_id":"abcdefg",
    "link_id":"ABCDEFGHIJ"
}
```

FIG.34 http://relay.server.com/get_file?path=/User%20A/filea&storage_id=abcdefg&link_id=ABCDEFGHIJ

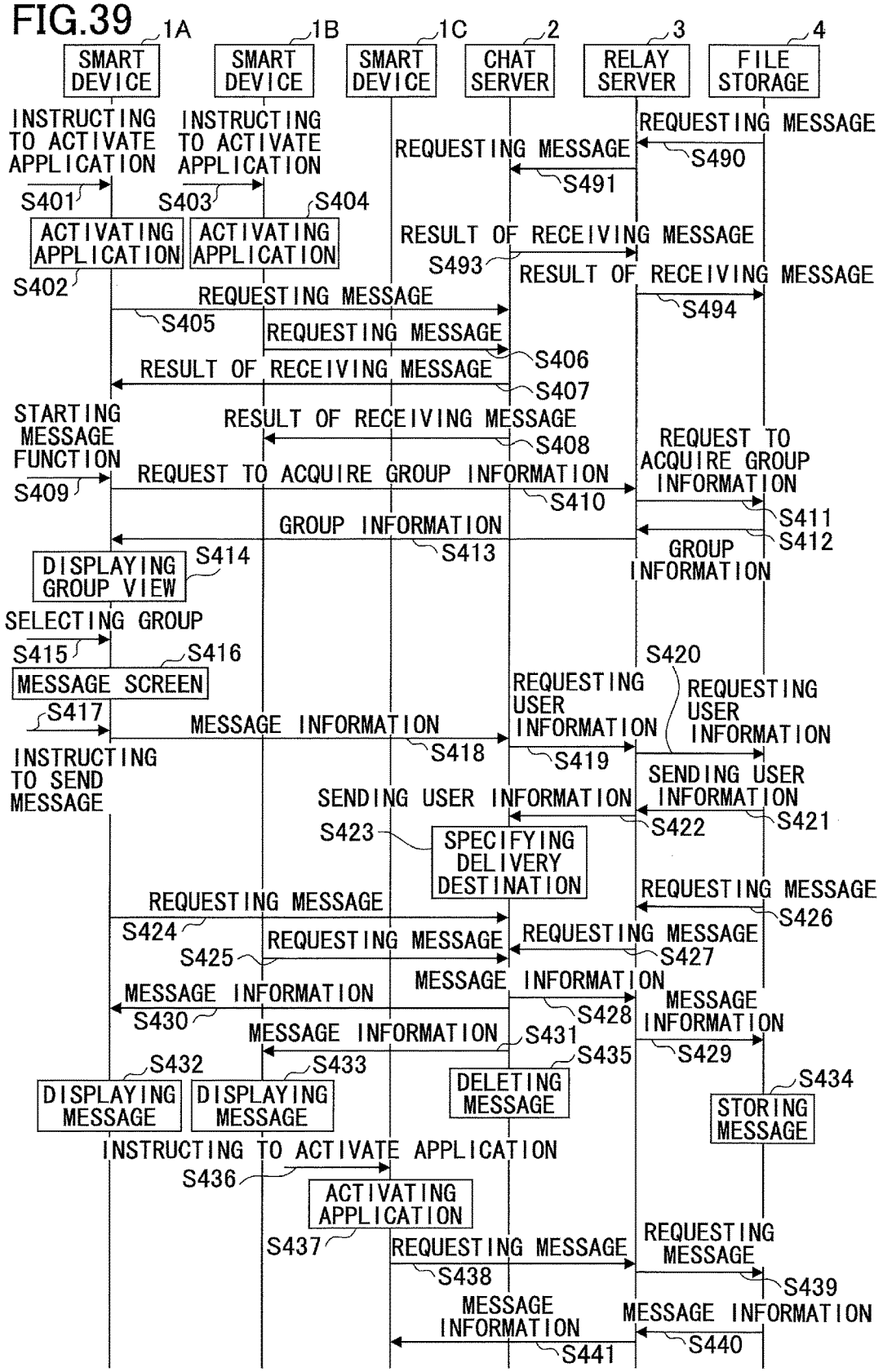

INFORMATION PROCESSING SYSTEM AND METHOD OF PROCESSING INFORMATION

BACKGROUND OF THE INVENTION

1. Field of the Invention

The present invention relates to a technique of controlling an access to an electronic file.

2. Description of the Related Art

A file storage provided in a network is frequently used to facilitate storage of an electronic file. Ordinarily, multiple users are registered in the file storage. Each user accesses the file storage using a dedicated ID and a dedicated password and stores or acquires a file. Folders called a "personal folder" and allocated to each user are frequently stored in the file storage. Only the user to whom each personal folder is allocated can access the personal folder.

FIG. 1 illustrates a directory structure of the file storage and an exemplary access. In the example illustrated in FIG. 1, users "User A", "User B", and "User C" are registered in the file storage, and the folders (the personal folders) of "User A", "User B", and "User C" are allocated to the corresponding users, who have authority of solely accessing the corresponding personal folder. According to the authority illustrated in FIG. 1, although the user "User A" can access "file a", "file y", and so on, the user "User A" cannot access "file 1" in a folder "User B" and "file i" in a folder "User C".

In such a file storage, a folder for sharing a file with users is frequently prepared. Referring to FIG. 1, the folder for sharing the file with the users is indicated by "Share". All users "User A", "User B", and "User C" who can access the file storage can access this folder "Share" (a shared folder).

In a case where the file stored in the personal folder is shared in the file storage, the file can be accessed by another user after copying or moving the file to the folder "Share".

Meanwhile, by giving exceptional authority to the file stored in the personal folder without using the folder "Share", it is possible for another user to access this file stored in the personal folder.

In the above method of sharing the file using the file storage, since a user operation such as copying/moving of the file or giving of the exceptional authority is necessary, the method of sharing the file is complicated.

Further, in a case where the file in the personal folder is copied or moved to the shared folder, there are problems that all users who can access the file storage can view the file, that a detailed setup of the authority cannot be performed, and that it is not possible to limit the access only to the specific user.

Patent Document 1 discloses a technique of sharing an engineering drawing, a progress of a process, or the like using a chat through a network for the purpose of effectively performing a collaboration among development actors in a product development. However, this technique cannot solve the above problem that the detailed setup of the authority cannot be easily performed.

Patent Document 1: Japanese Laid-Open Patent Publication No. 2005-258937

SUMMARY OF THE INVENTION

The present invention is provided in consideration with the above problems, and the object of the present invention is to enable predetermined users to share a file with a simple operation.

One aspect of the embodiments of the present invention may be to provide an information processing system including an information processing apparatus; and a plurality of terminal devices, wherein a first terminal device included in the plurality of terminal devices includes a first memory unit that stores information of the first user, a first acquisition unit that acquires a file name of one file included in at least one file stored in the information processing apparatus using the information of the first user stored in the first memory unit, a first reception unit that receives an instruction of sending the file name of one file acquired by the first acquisition unit, a first send unit that sends, when the instruction is received by the first receiving unit, the message, which includes the information of the first user used to acquire one file in the first acquisition unit and access information for accessing one file and a destination of which is the second user, to another information processing apparatus connected to the first terminal device, wherein a second terminal device included in the plurality of terminal devices includes a receiving unit that receives a message sent from the first terminal device from the another information processing apparatus based on information of the second user, a second reception unit that receives a selection of the message which includes the information of the first user and the access information among the message received by the receiving unit, and a second acquisition unit that acquires one file specified by the access information in the message using the information of the first user included in the message when the selection is received by the second reception unit, wherein the information processing apparatus includes a second memory unit that stores the at least one file and the information of the user who can access each of the at least one file, a determination unit that determines whether one file is sent to the second terminal device based on the information of the first user used to acquire one file by the second terminal device and information of the user who can access one file, the information of the user who can access one file being stored in the second memory unit, and a second send unit that sends one file to the second terminal device when the determination unit determines that one file is sent to the second terminal device.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 14 is a flow chart illustrating an exemplary process in a smart device at the time when the apparatus registration is successful.

FIG. 15 illustrates examples of a registered user name ad information of a terminal ID.

FIG. 17 illustrates examples of a group name ad information of a user name.

FIG. 32 illustrates an exemplary authority administration table.

FIG. 33 illustrates exemplary information included in a link sent from the chat server.

FIG. 34 illustrates an exemplary file acquisition message sent from a smart device.

FIG. 39 is a sequence chart illustrating an exemplary message sending process.

DETAILED DESCRIPTION OF THE PREFERRED EMBODIMENTS

A description is given below, with reference to the FIG. 1 through FIG. 39 of embodiments of the present invention. Where the same reference symbols are attached to the same parts, repeated description of the parts is omitted.

Reference symbols typically designate as follows:
1, 1A-1C: smart device;
11: display unit;
12: operation unit;
13: chat send and receive unit;
14: file link generation unit;
15: two-dimensional code read unit;
16: setup administration unit;
17: file list acquisition unit;
18: file send and receive unit;
19: file administration unit;
2: chat server;
21: chat send and receive unit;
22: user and group administration unit;
23: file send and receive unit;
24: authority information administration unit;
3: relay server;
31: data relay unit;
4: file storage;
41: file send and receive unit;
42: user administration unit;
43: file administration unit;
44: log administration unit;
45: request inquiry unit;
46: request process unit;
5: PC;
N1, N2: network; and
FW: firewall.

<Structure>

Figure 1:
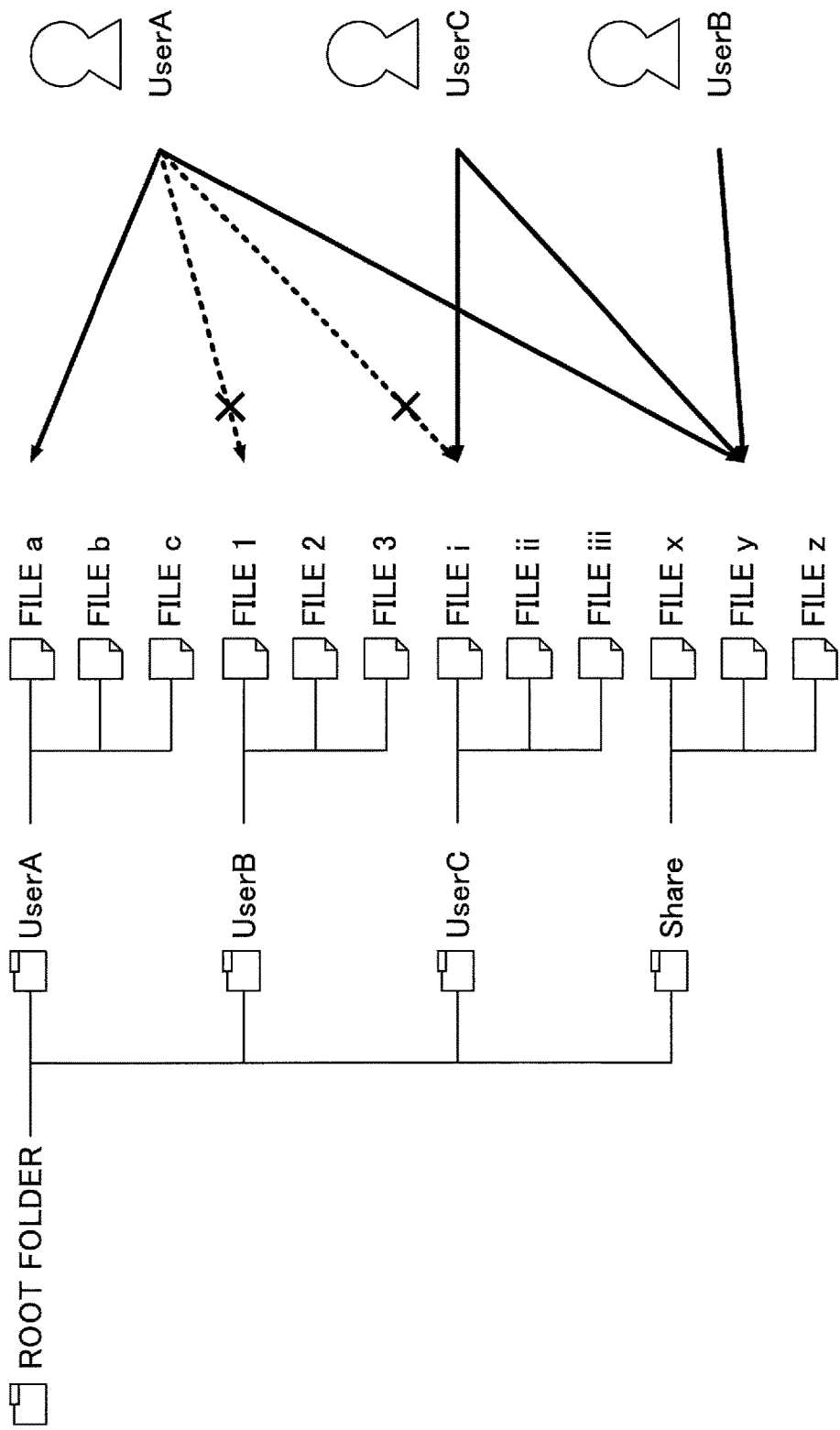
FIG. 1 illustrates a directory structure of a file storage and an exemplary access.
Figure 2:
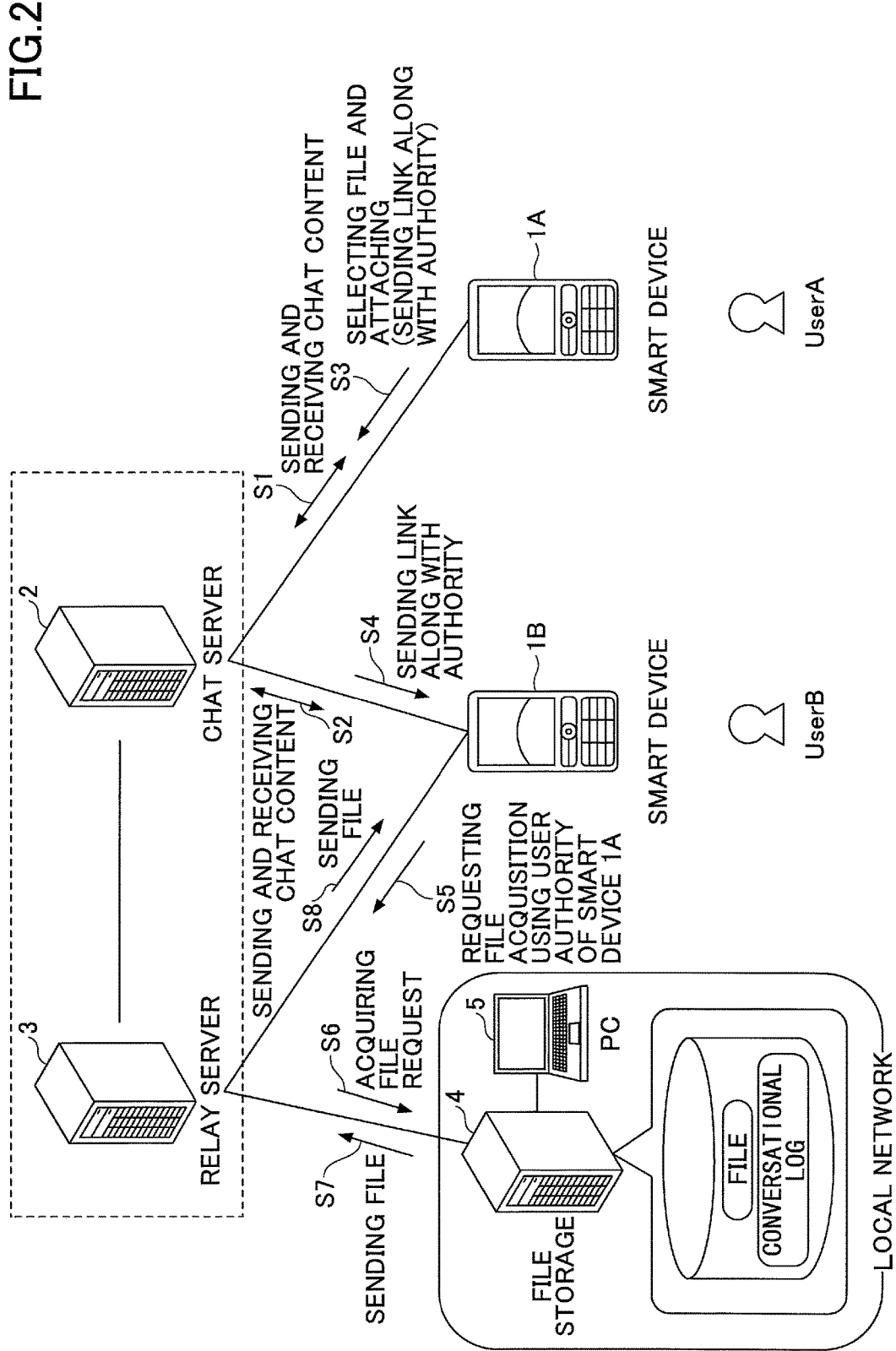
FIG. 2 illustrates an exemplary system structure of an embodiment.

FIG. 2 illustrates an example system structure of an embodiment.

Referring to FIG. 2, smart devices 1A and 1B are portable terminals used by a user A and a user B, respectively. The smart devices 1A and 1B can communicate with a chat server 2 and a relay server 3 in the network. The chat server 2 and the relay server 3 can be integrated into a single apparatus.

The chat server 2 is provided to receive and deliver a conversational content or the like between the smart devices 1 (1A, 1B, . . . ).

The relay server 3 temporarily receives a request from the chat server 2 or the smart device 13 to a file storage 4 connected to a local network and relays the request to the file storage 4.

The file storage (file server) 4 is a server that accumulates files and controls an access to the files based on the authority given to the user. Files retained by the user A and the user B and a conversational log obtained by the chat server 2 are stored in the file storage 4. The file storage 4 is connected to the local area network. Although the smart device 1, the chat server 2, and the relay server 3 cannot directly access the file storage 4, the file storage 4 can directly access the smart device 1, the chat server 2, and the relay server 3. Further, the file storage 4 constantly check the relay serves 3 whether an instruction or a data for the file storage 4 is retained by the relay server 3. If the instruction or the data for the file storage 4 is retained by the relay server 3, the file storage server acquires the instruction or the data and processes the instruction.

PC 5 is a terminal device connected to the file storage 4 inside the local network.

Figure 3:
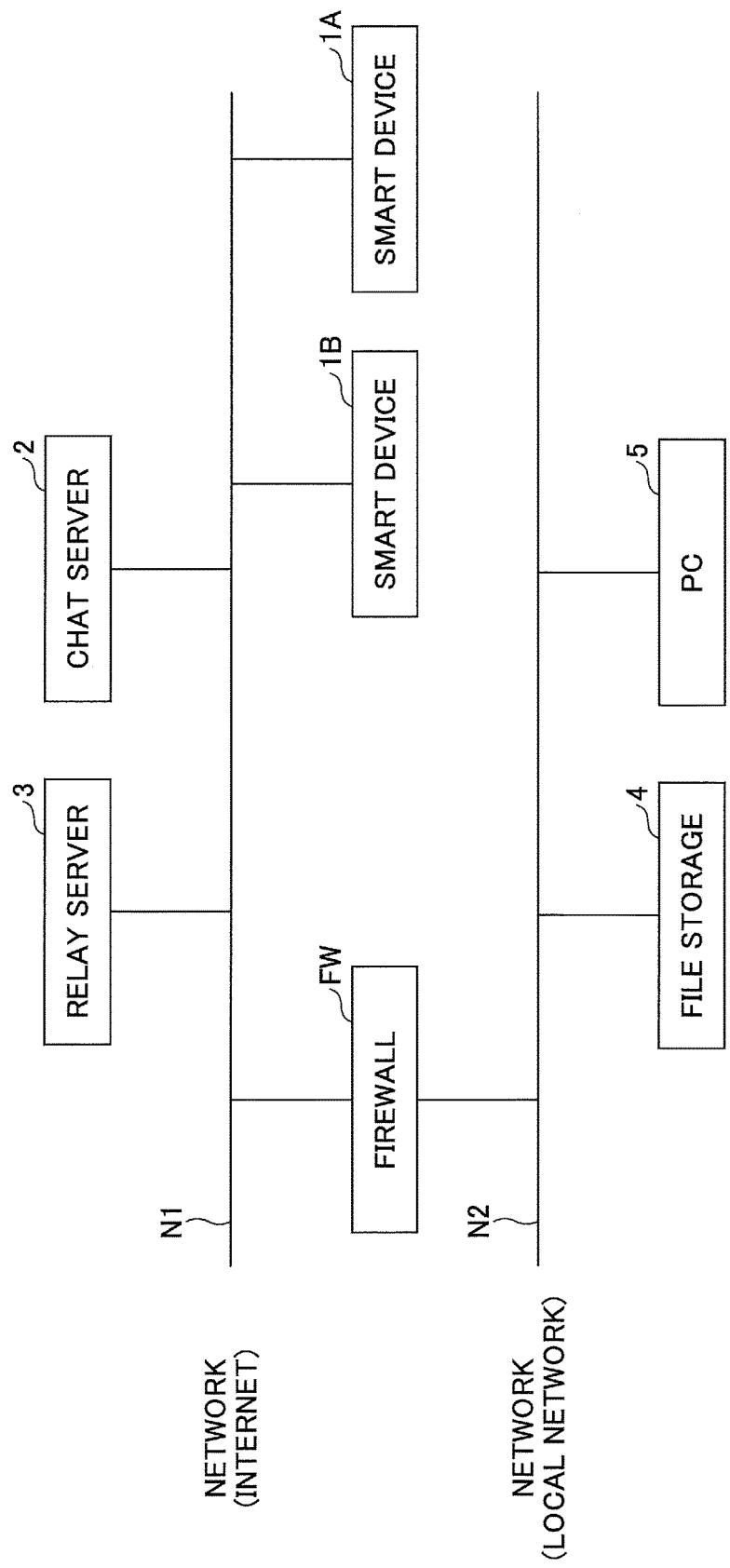
FIG. 3 illustrates an exemplary network structure.

FIG. 3 illustrates an exemplary network structure.

Referring to FIG. 3, the smart devices 1A and 1B, the chat server 2, and the relay server 3 are connected to a global network N1 such as the Internet and are mutually communicable. The file storage 4 is ordinarily connected to a local network N2 inside a firewall FW. The PC 5 is also connected to the local network N2. Although it is not possible for a device on a side of the network N1 to directly access a device on a side of the local network N2, the device on the side of the local network N2 can directly access the device on the side of the network N1.

Further, the smart device 1 sends a request to the file storage 4 to the relay server 3, and the file storage 4 inquires this request to the relay server 3 and receives this request. Then, a processing result obtained in the file storage 4 is sent to the relay server 3, and the smart device 1 receives the processing result from the relay server 3. Then, it is possible for the smart device 1 to indirectly send a request from the smart device 1 to the file storage 4 through the relay server 3. Although the PC 5 is connected to the local network N2 in FIG. 3, the smart device 1a or 1B may be connected. In this case, the smart device 1A or 1B directly accesses the file storage 4 in a manner similar to the PC 5. Further, the PC 5 may be connected to the network N1, which is global. In this case, the PC 5 sends the request to the file storage 4 and receives the processing result from the file storage 4 through the relay server 3 in a manner similar to the smart device 1A or 1B.

Figure 4:
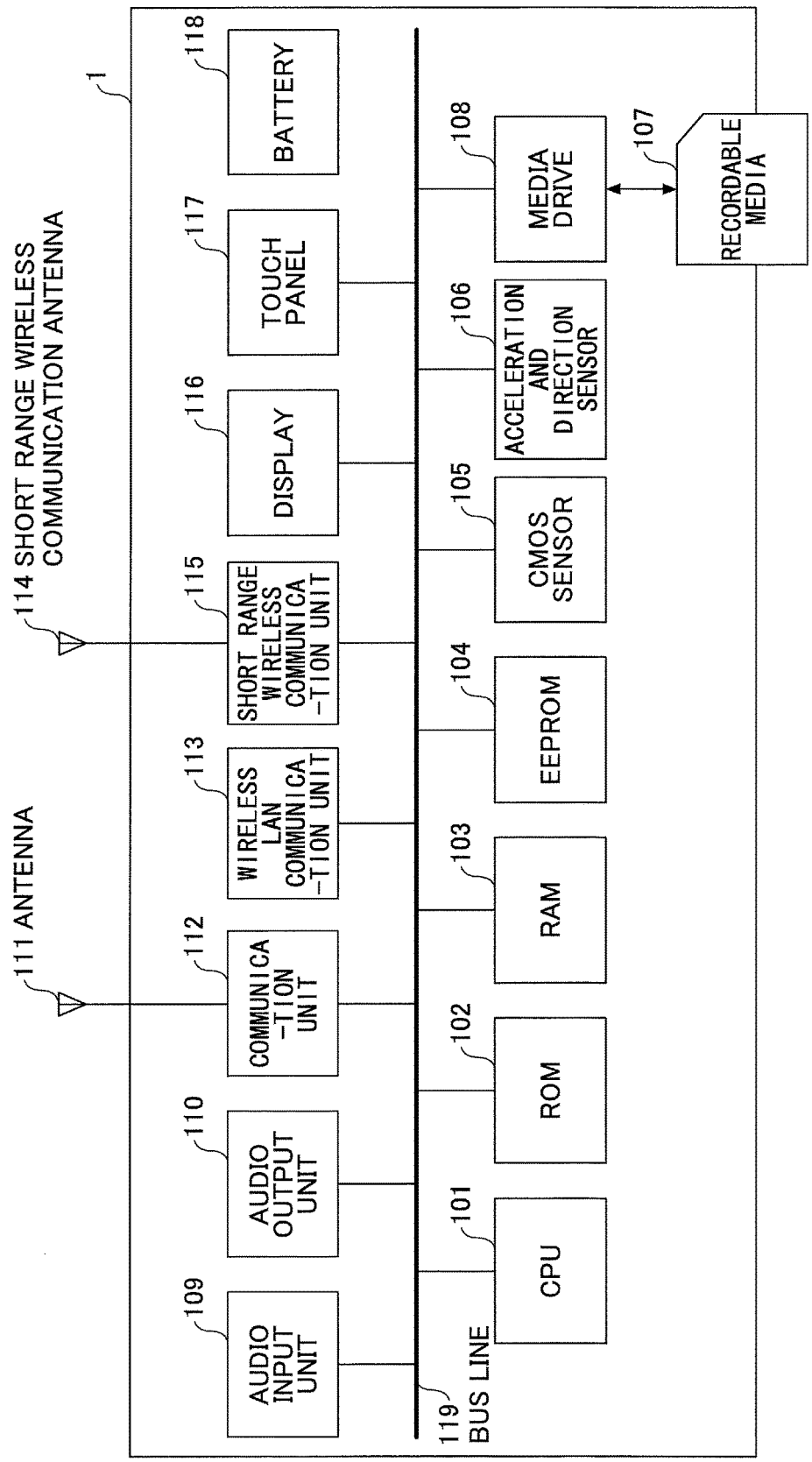
FIG. 4 illustrates an exemplary hardware structure of a smart device.

FIG. 4 illustrates an exemplary hardware structure of the smart device 1 (1A, 1B).

Referring to FIG. 4, the smart device 1 includes a CPU 101 that controls an entire operation of the smart device 1, a ROM 102 that stores a basic input and output program, a RAM 103 that is used as a work area for the CPU 101, an EEPROM 104 that reads or writes data in conformity with a control of the CPU 101, a Complementary Metal Oxide Semiconductor (CMOS) sensor 105 that captures an image of a photographic subject and acquires an image data of the photographic subject in conformity of the control of the CPU 101, an electromagnetic compass or a gyrocompass that detects earth magnetism, various acceleration and direction sensor 106 such as an acceleration sensor, and a media drive 108 that controls reading or writing (storing) data from or to an attachable and detachable recordable media 107 such as a flash memory.

The EEPROM 104 stores an operating system (OS) to be executed by the CPU 101, association information necessary for a network setup, or the like. An application program operated in the smart device 1 is stored in the EEPROM 104 or the media drive 107. Further, the CMOS sensor 105 is a charged coupled device that digitizing the image of the photographic subject. As long as the image of the photographic subject can be captured, a Charge Coupled Device (CCD) sensor may be used instead of the CMOS sensor.

Further, the smart device 1 includes an audio input unit 109 that converts a sound into a sound signal, an audio output unit 110 that converts the sound signal into the sound, a communication unit 112 that communicates with a nearest base station device 91 using a wireless communication signal through an antenna 111, a wireless LAN communication unit 113 that performs a wireless LAN communication with an access point in conformity with the standard of IEEE80111, a short range wireless communication unit 115 that performs a short range wireless communication such as a Bluetooth ("Bluetooth" is a registered trademark) communication through a short range wireless communication antenna 114, a display 116 that is made of a liquid crystal or an organic EL and displays the image of the photographic subject, various icons, and so on, a touch panel that is mounted on the display 116 and made of a pressure sensitive or electrostatic type panel and detects a position on the display 119 touched by a finger, a touch pen, or the like, and a bus line 119 such as an address bus or a data bus that electrically connects the above various portions. Further, the smart device 1 has a dedicated battery 118, with which the smart device 1 is driven. Further, the audio input unit 109 includes a mike where the sound is input. The audio output unit 110 includes a speaker outputting the sound.

Figure 5:
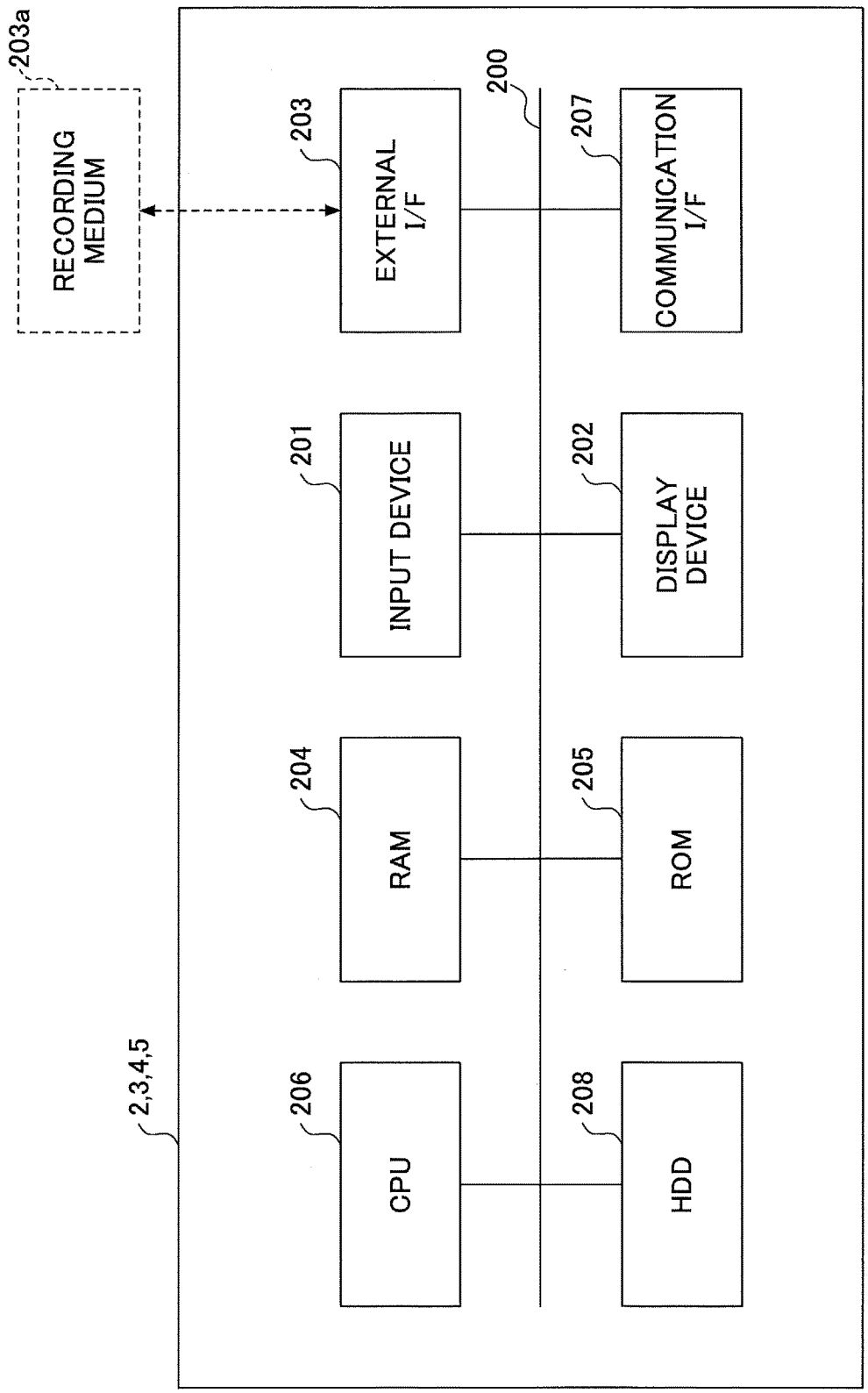
FIG. 5 illustrates an exemplary hardware structure of a chat server, a relay server, a file storage, and a PC.

FIG. 5 illustrates an exemplary hardware structure of the chat server 2, the relay server 3, the file storage 4, and the PC 5.

Referring to FIG. 5, each of the chat server 2, the relay server 3, the file storage 4, and the PC 5 includes an input device 201, a display device 202, an external I/F 203, a RAM 204, a ROM 205, a CPU 206, a communication I/F 207, a HDD 208, and so on, which are mutually connected by a bus 200.

The input device 201 may include a keyboard, a mouse, and so on, which are used to input various operation signals. The display device 202 includes a display or the like, which displays a processing result. The external I/F 203 is an interface with an external apparatus. The external apparatus includes a recording medium 203a and so on. Data can be read from and/or written in the recording medium 203a through the external I/F 203. The recording medium 203a includes a flexible disk, a CD, a Digital Versatile Disk (DVD), an SD memory card, a Universal Serial Bus (USB) memory, and so on.

The RAM 204 is a volatile semiconductor memory (a memory device) temporarily storing a program and/or data. The ROM 205 is a non-volatile semiconductor memory (a memory device), which can hold a program and/or data even when a power source is powered off. The ROM 205 stores a program and data for a Basic Input/Output System (BIOS), OS setup, network setup, or the like, which are executed at a time of booting up. The CPU 206 reads the program and/or the data from the memory device such as the ROM 205, the HDD 208, or the like. The read program or the read data undergo a process to thereby substantialize a control or a function of the chat server 2, the relay server 3, the file storage 4, and the PC 5 in their entireties.

The communication I/F 207 is an interface for connecting to the network. Through the communication I/F 207, the data communication can be performed with other apparatuses and other machines.

The HDD 208 is a non-volatile memory device that stores programs and data. The stored program and data are the operating system (OS), which is basic software controlling the entire apparatus, application software providing various functions in the OS, and so on. Further, the HDD 208 manages the stored program and data using a predetermined file system and/or a data base (DB).

Figure 6:
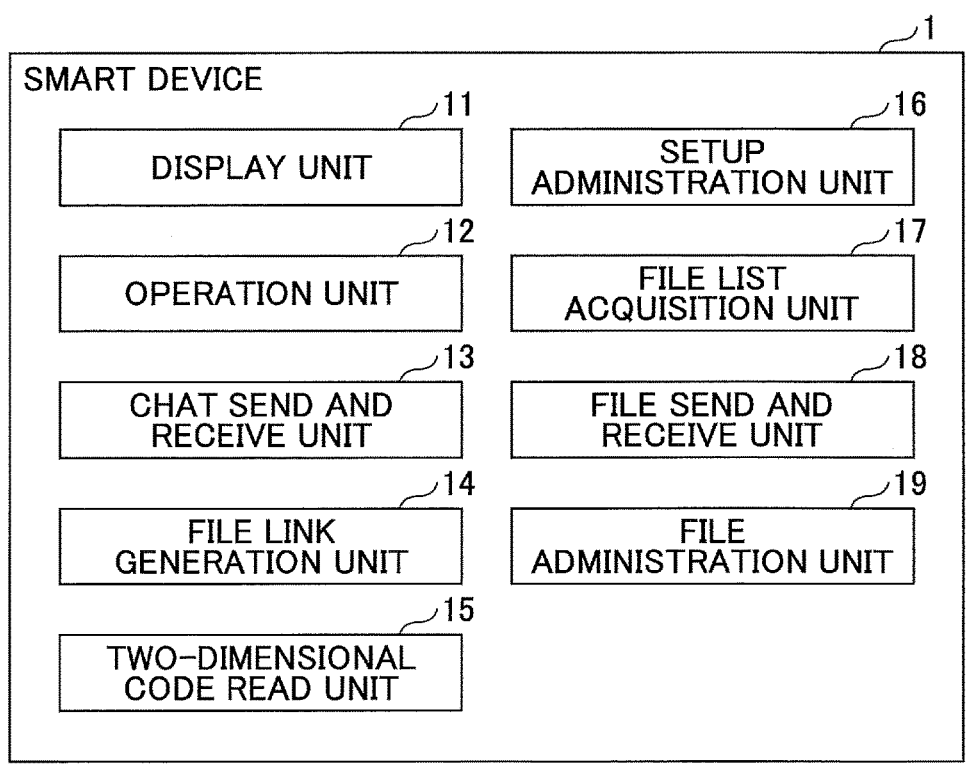
FIG. 6 illustrates an exemplary functional structure of a smart device.

FIG. 6 illustrates an exemplary functional structure of the smart device 1.

Referring to FIG. 6, the smart device 1 includes a display unit 11, an operation unit 12, a chat send and receive unit 13, a file link generation unit 14, a two-dimensional code read unit 15, a setup administration unit 16, a file list acquisition unit 17, a file send and receive unit 18, and a file administration unit 19.

The display unit 11 has a function of displaying the information for the user. The operation unit 12 has a function of receiving a user operation. The chat send and receive unit 13 has a function of sending and receiving a conversational content of the chat to and from the chat server 2. The file link generation unit 14 has a function of generating a link for acquiring the file. The two-dimensional code read unit 15 has a function of reading a two-dimensional code. The setup administration unit 16 has a function of administering a setup of the ID of the file storage 4, a user ID, and so on. The file list acquisition unit 17 has a function of acquiring a list of files stored in the file storage 4. The file send and receive unit 18 has a function of sending and receiving the file. The file administration unit 19 has a function of administering the received file.

Figure 7:
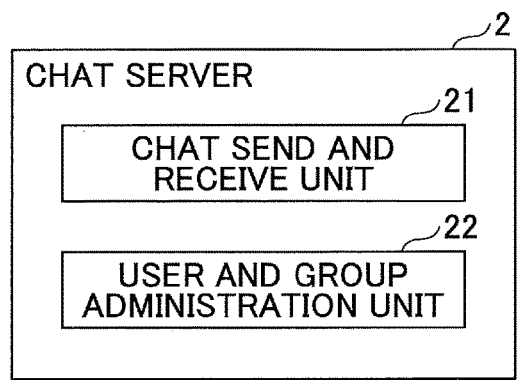
FIG. 7 illustrates an exemplary functional structure of the chat server.

FIG. 7 illustrates an exemplary functional structure of the chat server 2.

Referring to FIG. 7, the chat server 2 includes a chat send and receive unit 21 and a user and group administration unit 22.

The chat send and receive unit 21 receives the conversational content of the chat sent from the smart device 1 and sends the conversational content of the chat to another smart device 1. The user and group administration unit 22 has a function of administering a user participating in the chat and a group to which the content of the chat is sent.

Figure 8:
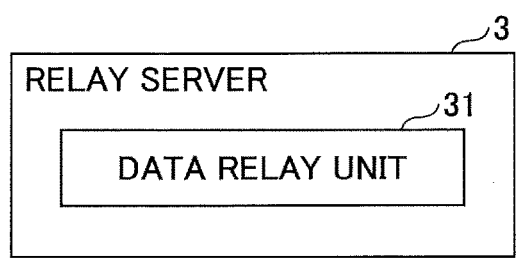
FIG. 8 illustrates an exemplary functional structure of a relay server.

FIG. 8 illustrates an exemplary functional structure of the relay server 3.

Referring to FIG. 8, the relay server 3 includes a data relay unit 31 that has a function of relaying data sent and received between a device such as the smart device 1 or the chat server 2 and another device such as the file storage 4. As to the data sent to the file storage 4, the data are temporarily held by the relay server 3 and is handed to the file storage 4 after waiting for an access from the file storage 4. The data from the file storage 4 to the smart device 1 and the chat server 2 are simply relayed by the relay server 3.

Figure 9:
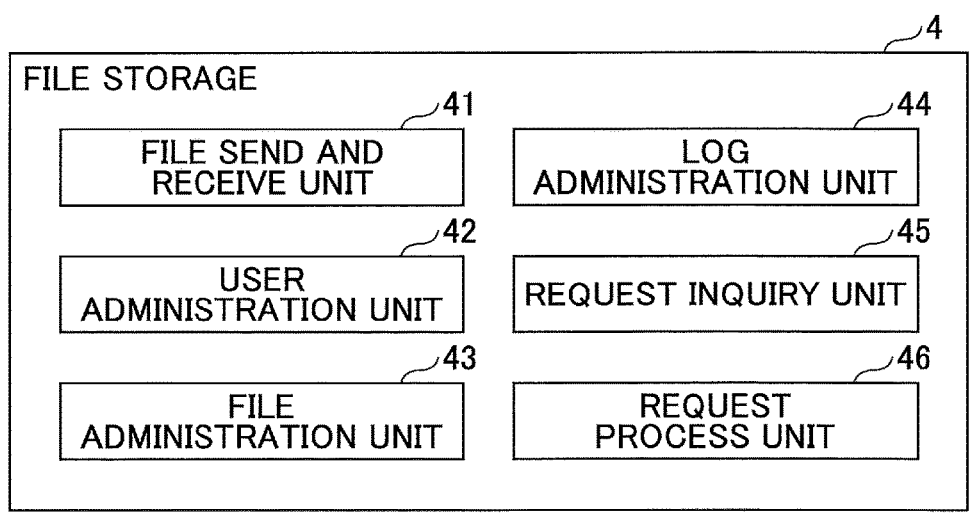
FIG. 9 illustrates an exemplary functional structure of the file storage.

FIG. 9 illustrates an exemplary functional structure of the file storage 4.

Referring to FIG. 9, the file storage 4 includes a file send and receive unit 41, a user administration unit 42, a file administration unit 43, a log administration unit 44, a request inquiry unit 45, and a request process unit 46.

The file send and receive unit 41 has a function of sending and receiving a file to and from a device connected to the file storage 4 through the network. The user administration unit 42 has a function of performing user authentication based on authority information in the file storage 4. The file administration unit 43 has a function of administering the file. The log administration unit 44 has a function of administering a chat log. The request inquiry unit 45 has a function of inquiring whether a request to the relay server 3 exists or not. The request process unit 46 has a function of processing the received request.

<Summary Operation>

At first, based on FIG. 2, a summary operation according to the above embodiment is described.

The smart devices 1A and 1B send or receive the chat content through the chat server 2 in conformity with operations by the users A and B in steps S1 and S2.

A file required to be shared by the user A is selected by the smart device 1A, and a link including authority information for the file is attached to the chat content is step S3. Then, the chat content attached with the link is sent to the smart device 1B through the chat server 2 (step S4).

After the user clicks the link in the smart device 1B, the smart device 1B requests the relay server 3 to acquire the file using user authority of the smart device 1A based on the authority information included in the link (step S5).

After this request to acquire the file is temporarily accumulated in the relay server 3, this request to acquire the file is acquired by the file storage 4 (step S6).

Because the file storage 4 accesses the file retained by the user A using the authority of the user A, the file storage 4 acquires the corresponding file and sends it to the smart device 1B through the relay server 3 (steps S7 and S8).

<Apparatus Registration>

The apparatus registration is a process of registering the smart device 1 accessible to the file storage 4, wherein information of the smart device 1 is registered in the file storage 4 and simultaneously information necessary for accessing the file storage 4 is set to the smart device 1. This process is always performed regardless of whether the smart device passes through the relay server 3 at a time of accessing the file storage 4. It is sufficient to perform this process once for each smart device 1.

Before this process, the user of the smart device 1 previously creates an account in the file storage 4. Then, when the user accesses from the PC 5 to the file storage 4 in the local network and logs in using the own account of the user, the function of the user administration unit 42 of the file storage 4 causes a two-dimensional code for an apparatus registration for the own account to be displayed. By reading a screen having the two-dimensional code using a camera function of the smart device 1, the apparatus registration is performed.

Figures 10, 11:
FIG. 10 illustrates an exemplary two-dimensional code for an apparatus registration.
FIG. 11 illustrates an exemplary content recorded in the two-dimensional code for the apparatus registration.

FIG. 10 illustrates an exemplary two-dimensional code for the apparatus registration, and FIG. 11 illustrates an exemplary content recorded in the two-dimensional code for the apparatus registration. The two-dimensional code for the apparatus registration includes an ID inherent in the file storage 4, an IP address, an ID used at a time of going through the relay server 3, a link used for activation, a user ID, and a password.

Figure 12:
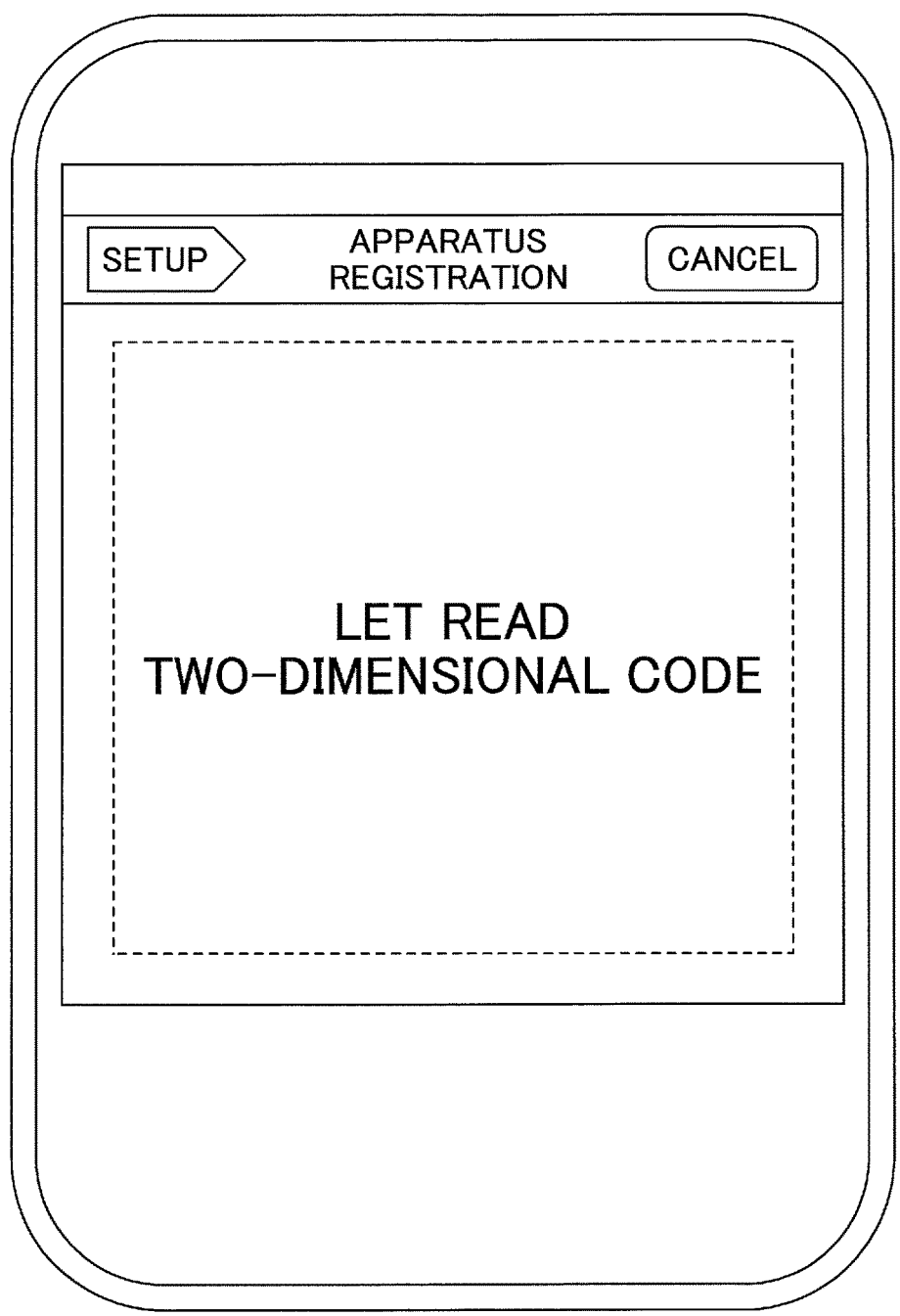
FIG. 12 illustrates an exemplary screen for reading the two-dimensional code for the apparatus registration.
Figure 13:
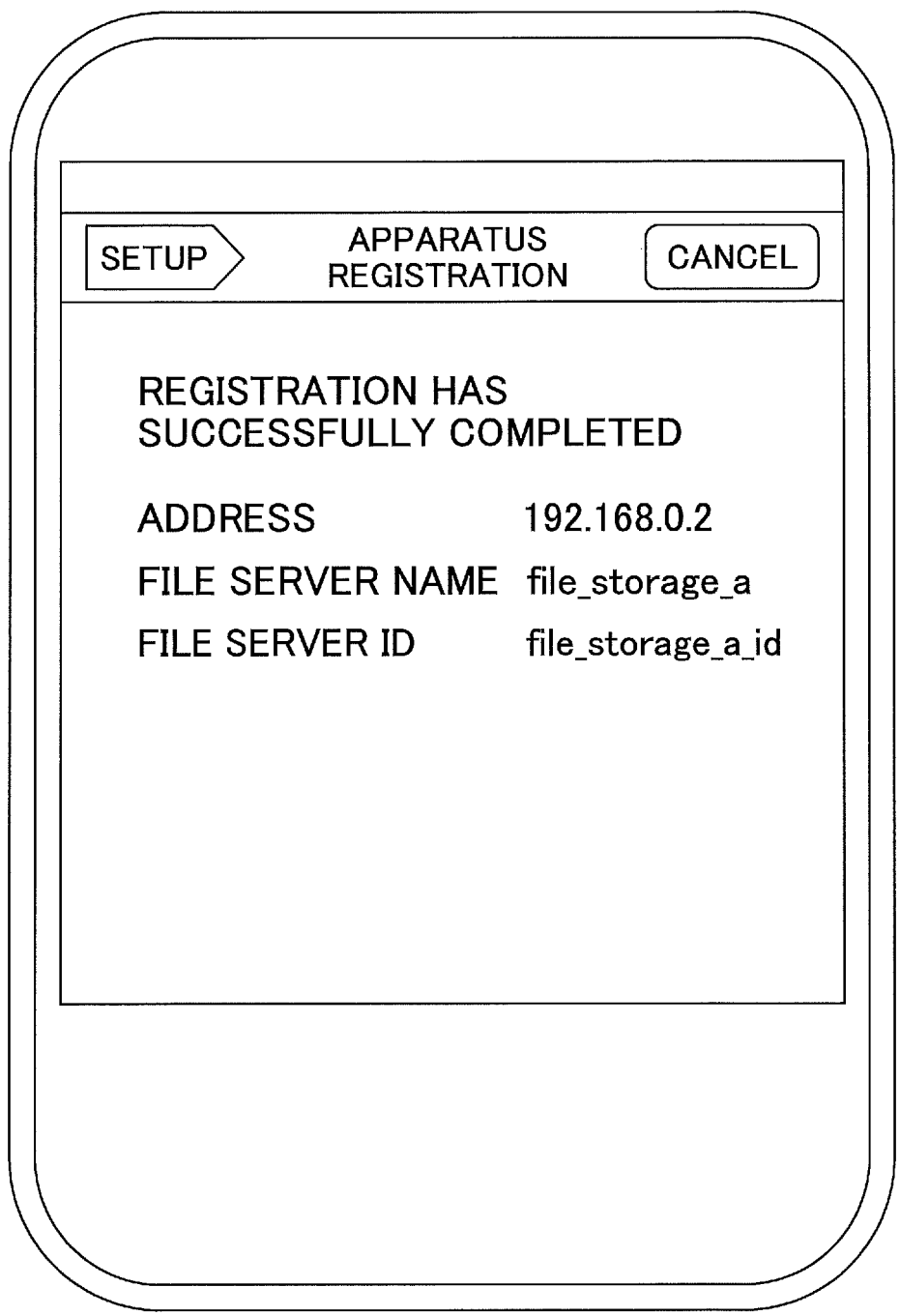
FIG. 13 illustrates an exemplary screen at a time when an apparatus registration is successful.

FIG. 12 illustrates an exemplary screen for reading the two-dimensional code for the apparatus registration. The exemplary screen is displayed on the smart device 1. FIG. 13 illustrates an exemplary screen at a time when the apparatus registration is successful.

FIG. 14 is a flow chart illustrating an exemplary process in the smart device at the time when the apparatus registration is successful.

Referring to FIG. 14, the smart device 1 acquires an address of "activate" from the read two-dimensional code for the apparatus registration in step S11, and accesses the address of "activate" together with the ID (generated inside the application) of the smart device in step S12. The address of "activate" designates the file storage 4. When the file storage 4 is accessed, the ID of the smart device 1 is registered in the file storage 4.

If the access is successful (YES of step S13), a screen f success is displayed (step S14), and access information that is used for accessing the file storage 4 and acquired from the two-dimensional code for the apparatus registration is stored inside the smart device 1 (step S15). Then, the process ends.

If the access is unsuccessful (NO of step S13), a screen of failure is displayed (step S16). Then, the process ends.

Thus, the activation is performed based on the information of the two-dimensional code for the apparatus registration to register the information of the smart device 1 in the file storage 4 and simultaneously register the information of the file storage 4 in the smart device 1. The file storage 4 does not allow the smart device to access the file storage 4 if the smart device 1 does not perform this operation. In a case where the file storage 4 is used from the smart device 1, it is necessary to perform the apparatus registration. After this apparatus registration, the smart device 1 can take out the information and the file stored in the file storage 4.

Specifically, the user administration unit 42 of the file storage 4 stores the registered user name (identification information for identifying the user) and a terminal ID (identification information for identifying a terminal) sent at the time of the user registration as illustrated in FIG. 15. For each registered user, a folder to which only the registered user can access may be made.

<Group Creation>

A group creation is a process of creating a group of chat members, namely, a group of members to whom a file is shared.

Figure 16:
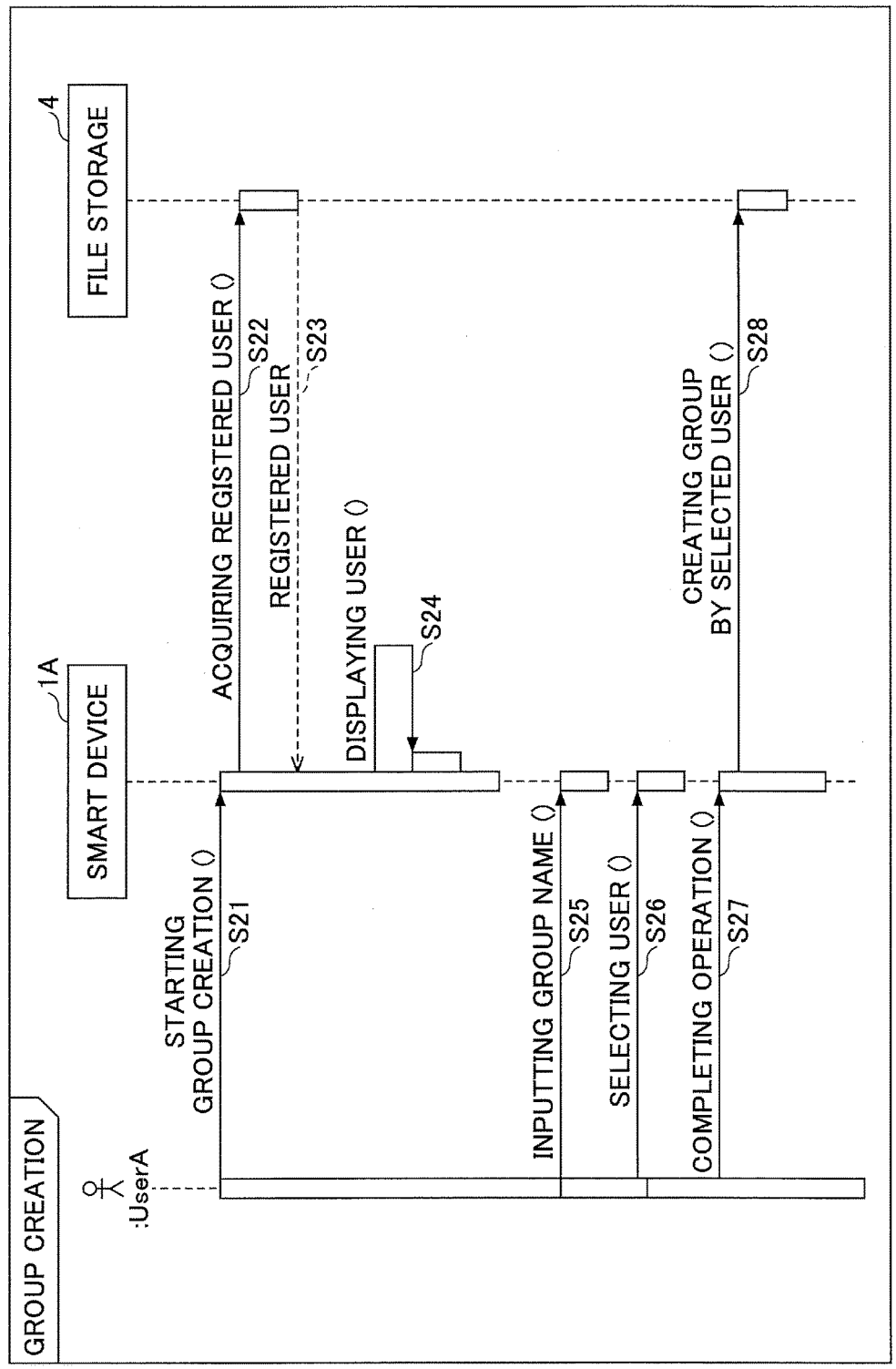
FIG. 16 is a sequence chart illustrating an exemplary process of group creation.

FIG. 16 is a sequence chart illustrating an exemplary process of the group creation. Because FIG. 16 is provided by assuming the access inside the local area network, the smart device 1A directly accesses the file storage 4. However, if the smart device 1A accesses the file storage 4 from the outside of the local network, the smart device 1A accesses the file storage 4 through the relay server 3.

Referring to FIG. 16, when the user A operates to start the group creation on the smart device 1A (step S21), the smart device 1A requests the file storage 4 to acquire the registered user (step S23).

In response thereto, the file storage responds by sending information of the registered user (the user to whom the apparatus registration is performed)(step S23). Then, the smart device 1A displays the user (step S24). In step S23, the file storage 4 sends the name of the registered user registered in the file storage 4 as illustrated in FIG. 15 to the smart device 1A.

Subsequently, the user inputs a group name is step S25, selects a user in step S26, and completes the input in step S27. Then, the smart device 1A requests the file storage 4 to create the group by the selected users in step S28. In response thereto, the file storage 4 creates a group having the selected user as a member. Referring to FIG. 17, the file storage 4 stores the group name (identification information for identifying a group) and the user name belonging to the group (the user name of the user selected in step S26).

Figure 18:
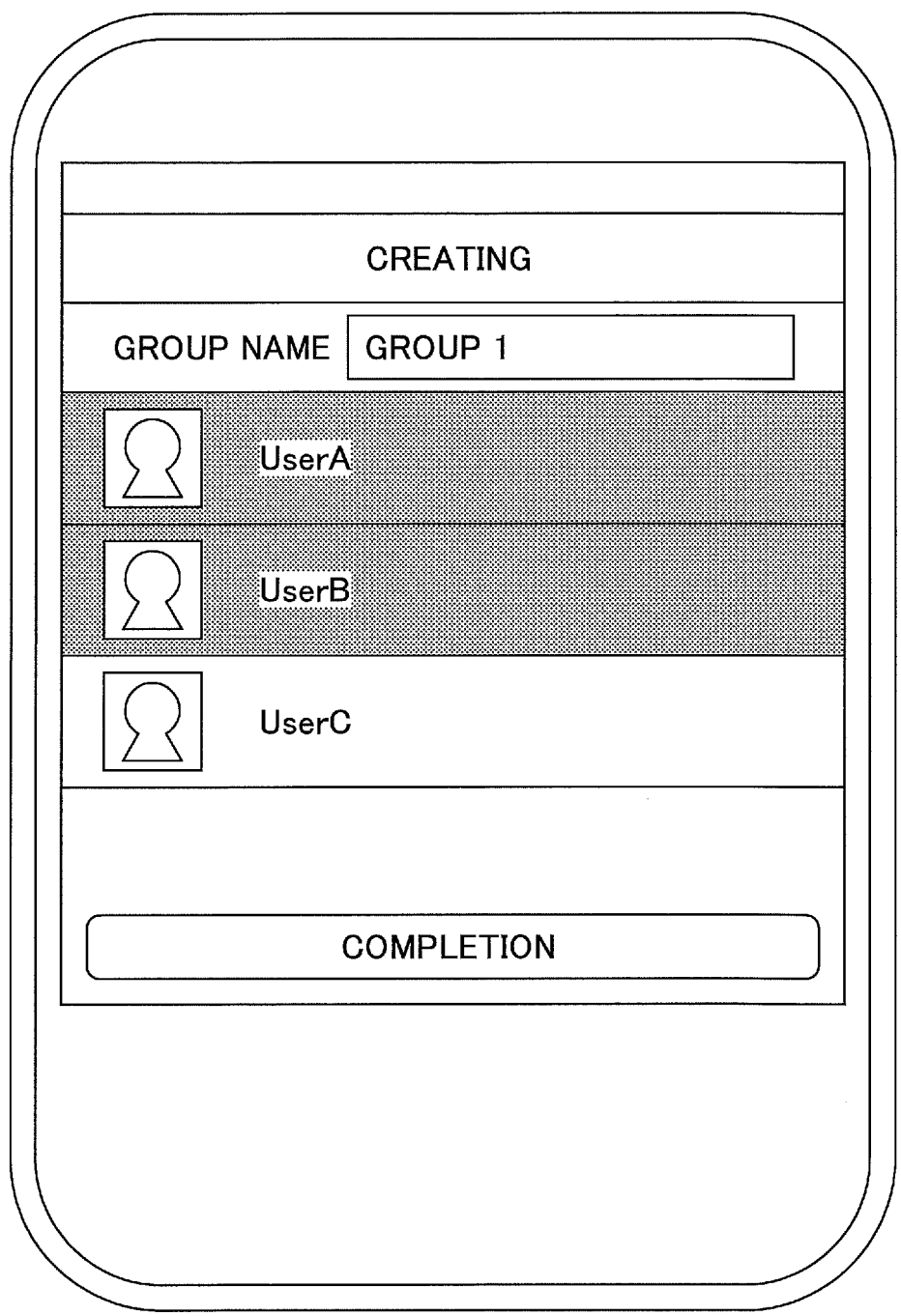
FIG. 18 illustrates an exemplary screen at a time of creating a group.

FIG. 18 illustrates an exemplary screen provided at a time of creating the group and includes a column for inputting a group name, a column displaying the registered users so as to be selected, a completion button, and so on.

<Chat>

Figure 19:
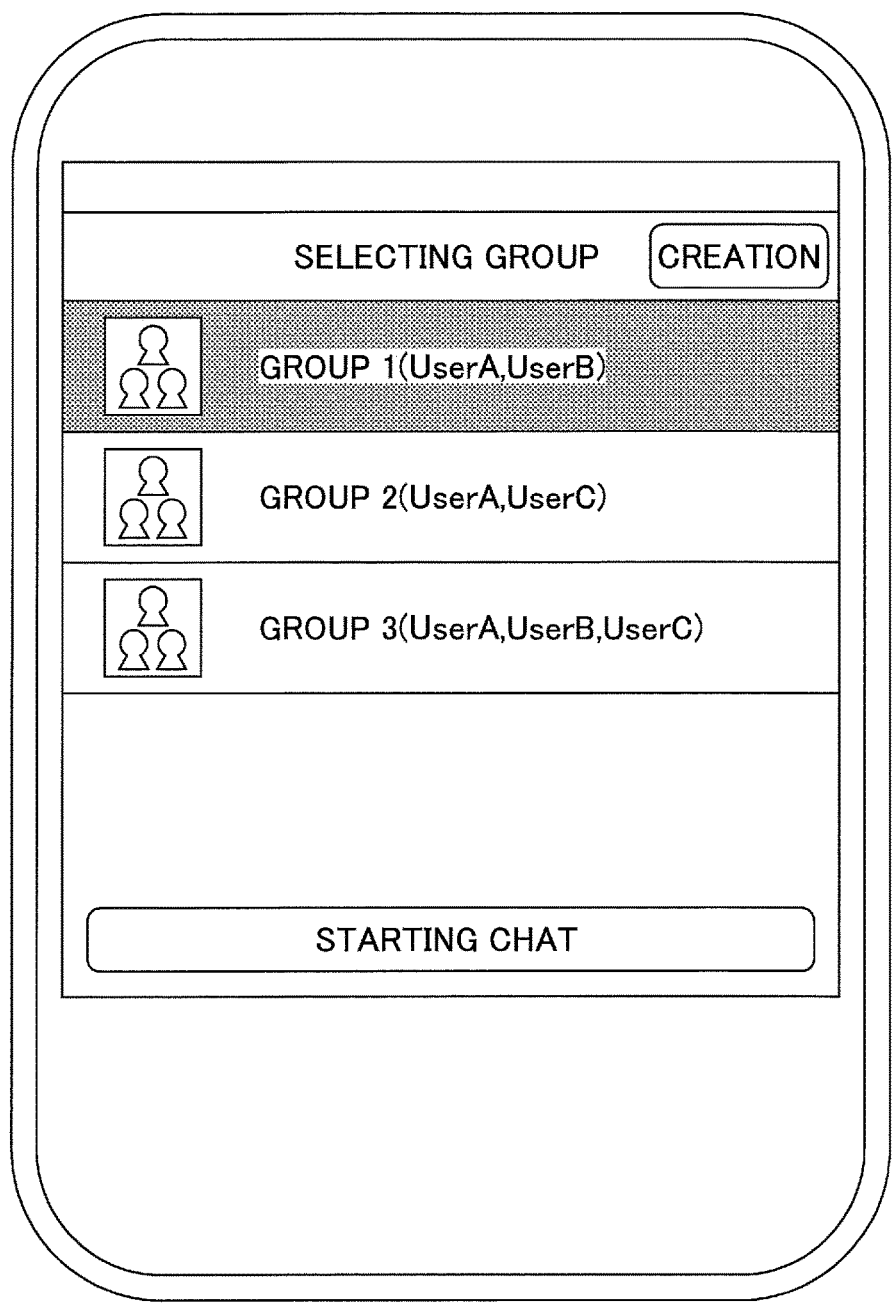
FIG. 19 is an exemplary screen of a chat start.

FIG. 19 is an exemplary screen of a chat start in the smart device 1. A view of the groups is acquired from the file storage (specifically, group information illustrated in FIG. 17 is acquired from the file storage 4). When the group is selected and thereafter a button of "starting chat" is selected, the information of the selected group is sent to the chat server 2 and a chat inside the group is started.

Figure 20:
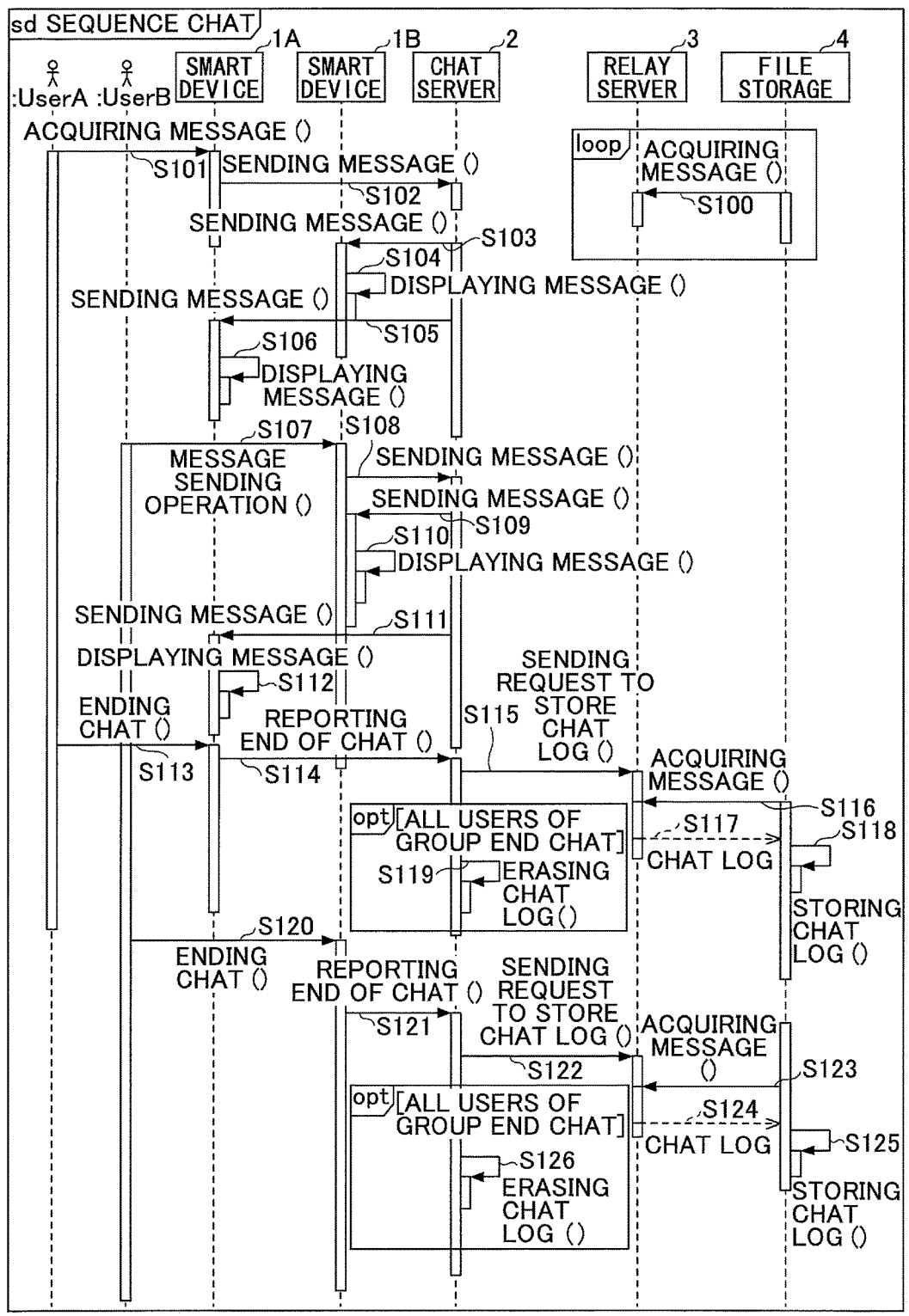
FIG. 20 is a sequence chart illustrating an exemplary process of processing a chat.

FIG. 20 is a sequence chart illustrating an exemplary process of processing a chat. The user A and the user B form the group, and the group is selected so that the chat is started.

Referring to FIG. 20, the file storage 4 periodically (for example, at an interval of one second) acquires a message of a request directed to the file storage 4 from the relay server 3 (step S100). If there is the request, a corresponding process is performed.

On the other hand, when the user A performs a message sending operation to the smart device 1A (step S101), the smart device 1A sends the message to the chat server 2 (step S102).

In response thereto, the chat server 2 sends the message to the smart device 1B (step S103), and the smart device displays the received message (step S104).

Further, the chat server 2 sends the message also to the smart device 1A (step S105), and the smart device 1A displays the received message (step S106). It is possible to omit the sending of the message to the sending source.

In a manner similar thereto, when the user B performs a message sending operation to the smart device 1B (step S107), the smart device 1B sends the message to the chat server 2 (step S108).

In response thereto, the chat server 2 sends the message to the smart device 1B (step S109), and the smart device 1B displays the received message (step S111). It is possible to omit the sending of the message to the sending source.

Further, the chat server 2 sends the message to the smart device 1A (step S111), and the smart device 1A displays the received message (step S112).

Thereafter, when the user A performs an operation of ending the chat to the smart device 1A (step S113), the smart device 1A reports the end of the chat to the chat server 2 (step S114).

In response thereto, the chat server 2 sends a request to store a chat log to the relay server (step S115).

The file storage 4 periodically acquires the message from the relay server 3 (step S116). When there is the request to store the chat log, the file storage 4 acquires the chat log of the message (step S117) and stores the acquired chat log (step S118).

The chat server 2 erases the chat log when the all users of the group end the chat (step S119). When the user B does not perform an operation of ending the chat, the chat log is not erased.

Thereafter, when the user B performs an operation of ending the chat to the smart device 1B (step S120), the smart device 1B reports the end of the chat to the chat server 2 (step S121).

In response thereto, the chat server 2 sends a request to store the chat log to the relay server (step S122).

The file storage 4 periodically acquires the message from the relay server 3 (step S123). When there is the request to store the chat log, the file storage 4 acquires the chat log of the message (step S124) and stores the acquired chat log (step S125).

Further, when all users including the user A and the user B of the group end the chats, the chat server 2 erases the chat log (step S126).

As described, the chat log is stored in the file storage 4 and is not left in the chat server 2. The chat server 2 does not administer the user or the group. The file storage 4 administering the user or the group stores the user or the group.

<File Share>

Figure 21:
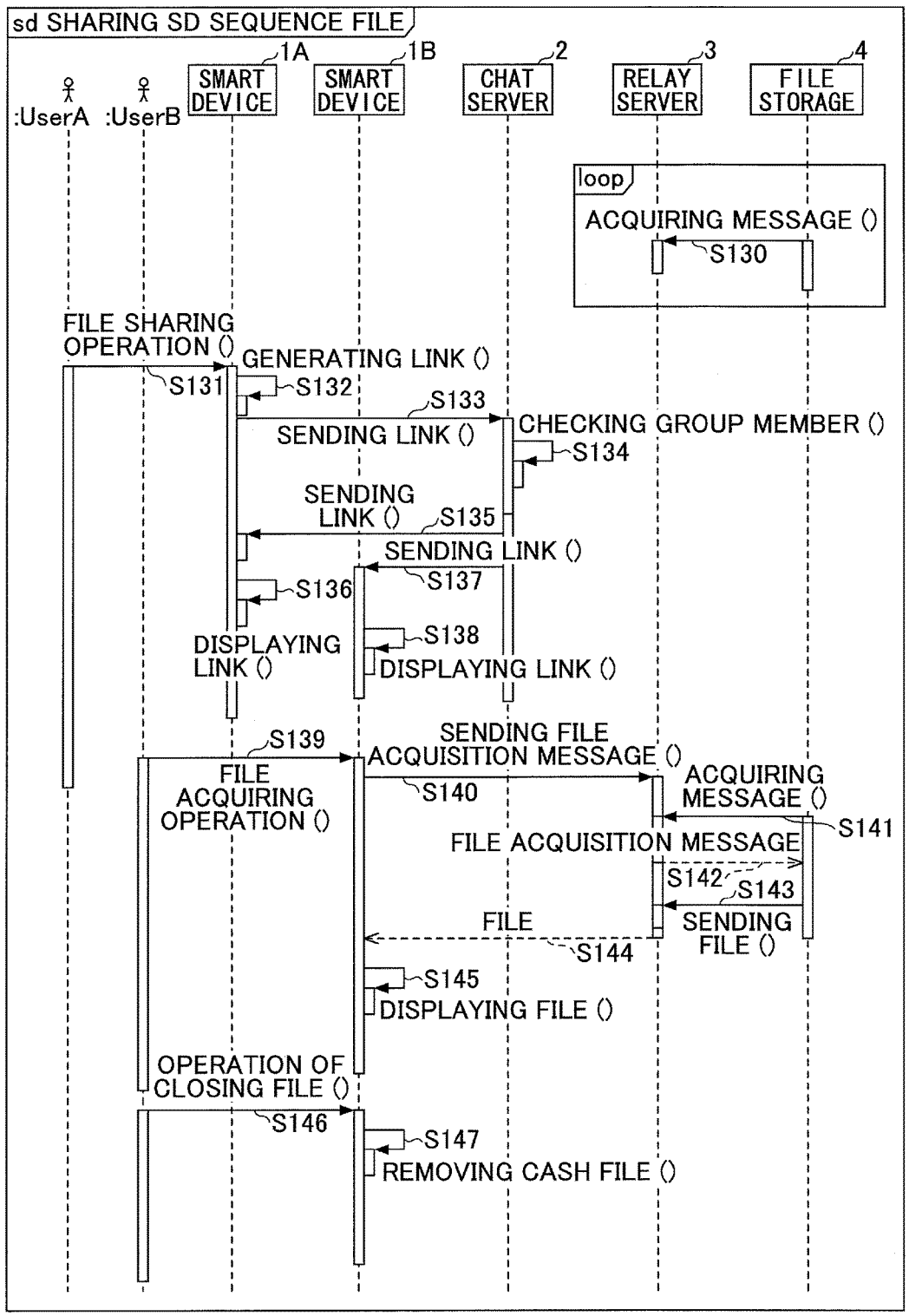
FIG. 21 is a sequence chart illustrating an exemplary process of processing a file share using the chat.

FIG. 21 is a sequence chart illustrating an exemplary process of processing the file share using the chat.

Referring to FIG. 21, the file storage 4 periodically acquires a message of a request directed to the file storage 4 from the relay server 3 (step S130). If there is the request, a corresponding process is performed.

Figure 22:
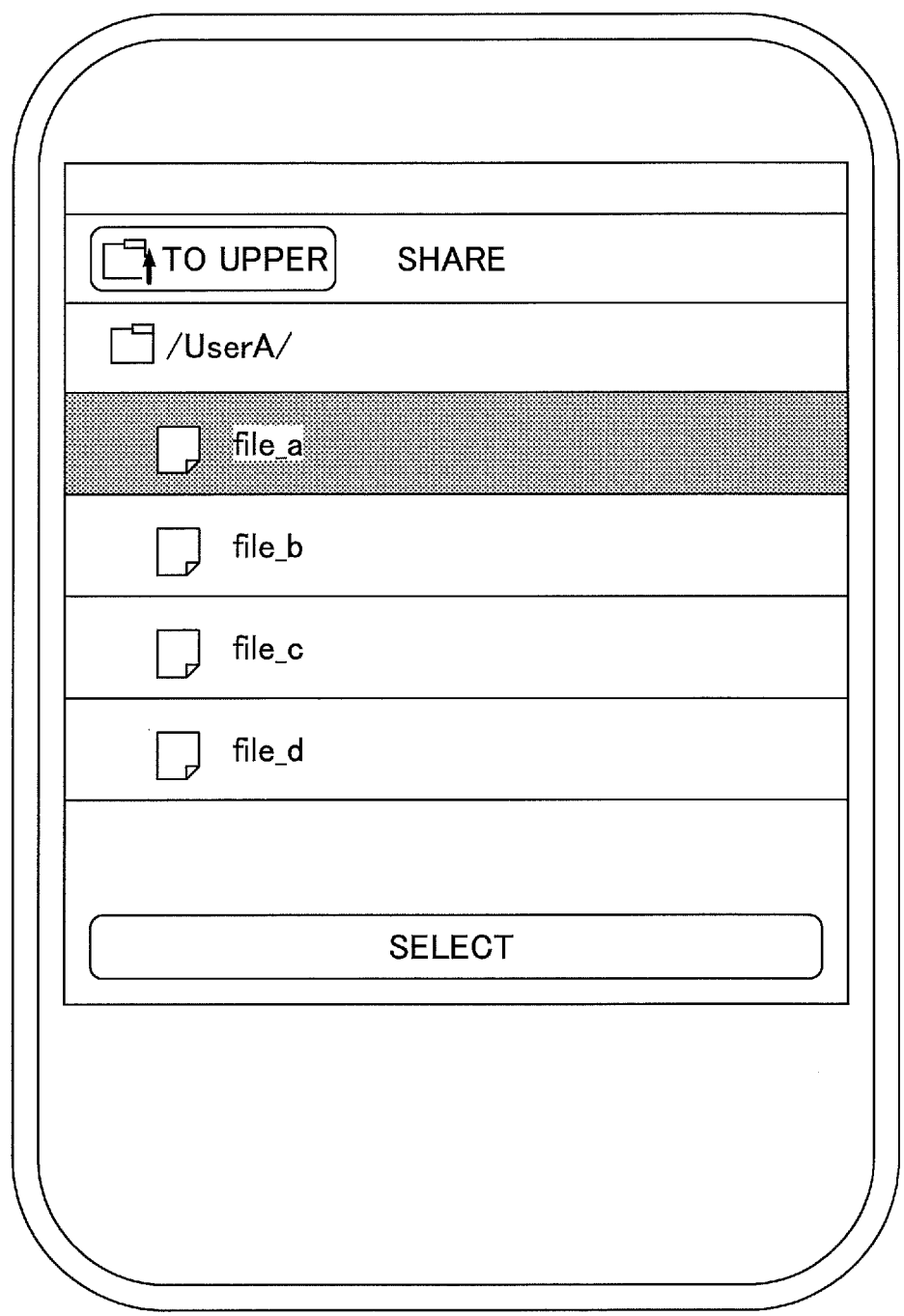
FIG. 22 illustrates an exemplary screen for selecting a shared file.

On the other hand, when the user A wish to share a file retained in a personal folder of the user A inside the group, an operation of sharing the file is performed for the smart device 1A (step S131). FIG. 22 illustrates an exemplary screen for selecting a shared file. The smart device 1A accesses the file storage 4 through the relay server 3, acquires a file list in the file storage 4, and displays the file list so as to be selected.

Referring back to FIG. 21, when the operation of sharing the file is received, the smart device 1A generates a link including path information for accessing the selected file and authority information (step S132), and sends the link to the chat server 2 (step S133).

Figures 23, 24:
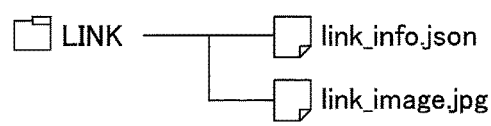
FIG. 23 illustrates exemplary data forming a link.
FIG. 24 illustrates an exemplary content of a file "link_info.json".

FIG. 23 illustrates exemplary data forming the link including a file of "link_info.json" being character string information and "link_image.jpg" being a thumbnail image of the file. It is preferable to compress to be a zip form. FIG. 24 illustrates an exemplary content of a file "link_info.json" including a path (a file path), a user ID, a password, a storage ID, a link ID, or the like.

Referring back to FIG. 21, after receiving the link the chat server 2 checks a member of the group (step S134) and sends the link to the smart device 1A (step S135). Then, the smart device 1A displays the link (step S136). It is possible to omit the sending of the message to the sending source.

Further, the chat server 2 sends the link to the smart device 1B (step S137), and the smart device 1B displays the received link (step S138).

Figure 25:
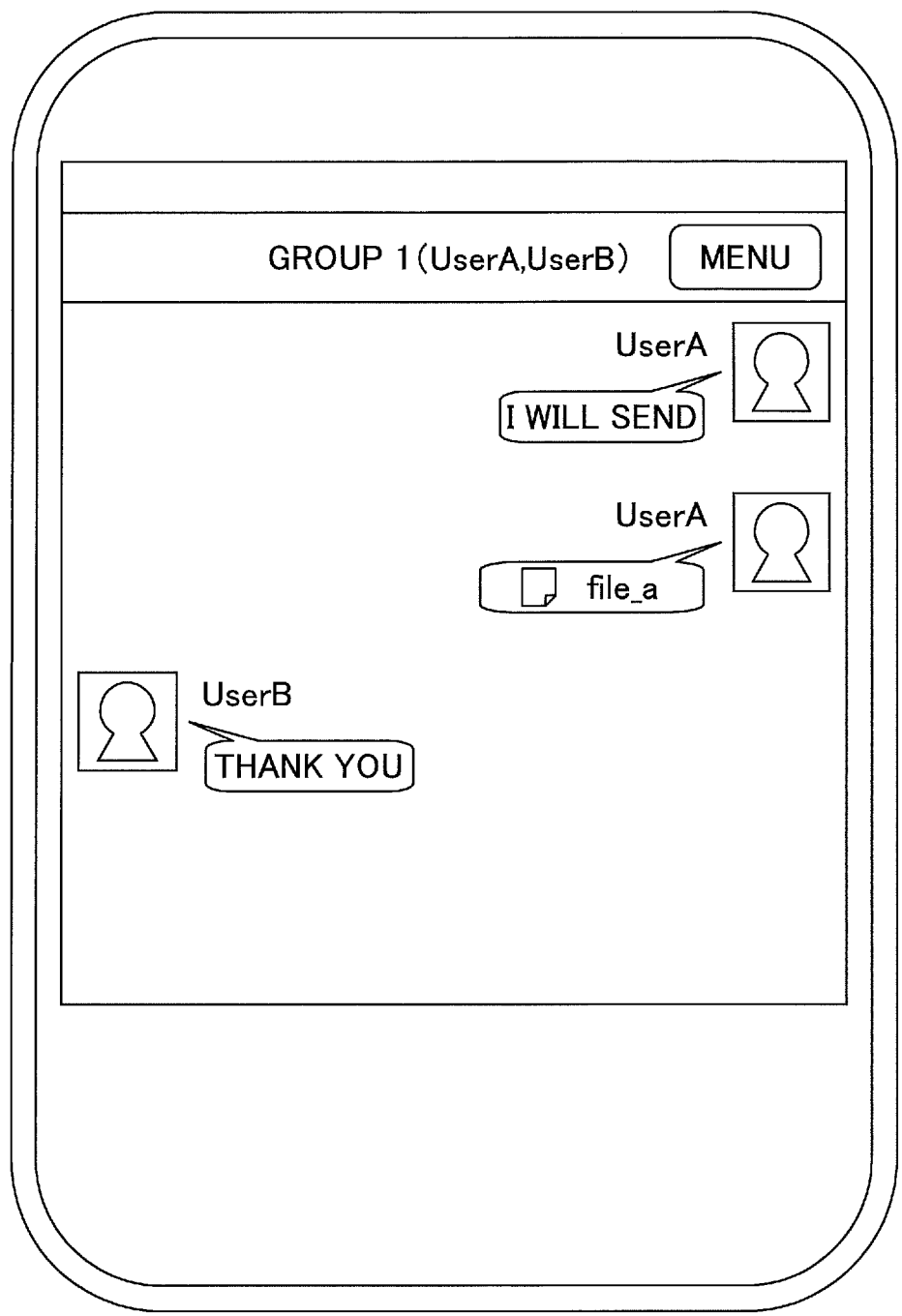
FIG. 25 illustrates an exemplary display of a link.
Figures 26, 27:
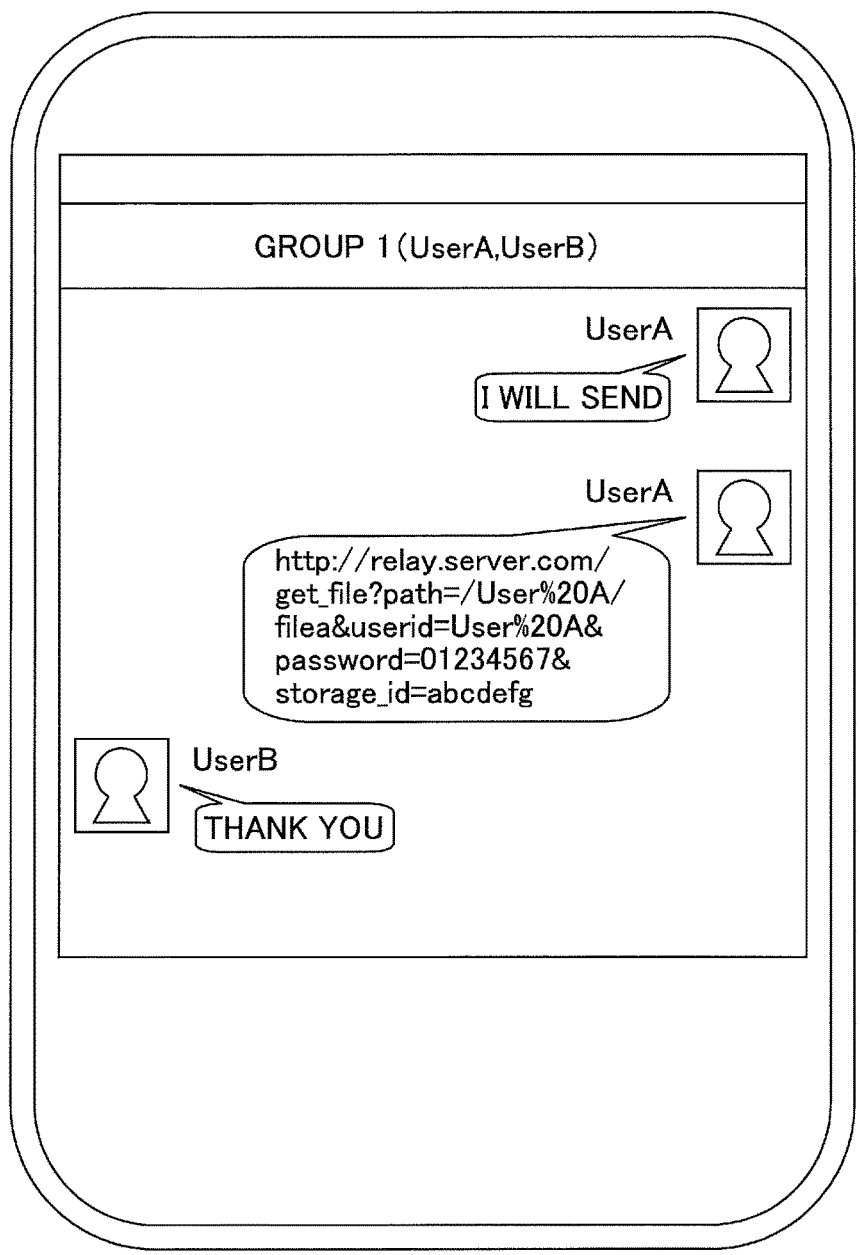
FIG. 26 illustrates an exemplary display of another link.
FIG. 27 illustrates an exemplary file acquisition message.

FIG. 25 illustrates an exemplary display of the link. When a message of the user A of "I will send" is sent and subsequently a message of the user A of the link of "file_a" is sent, the user B returns a message of "Thank you" to respond to the messages. Here, the link shows only the thumbnail image and the file name, and the authority information is not displayed. Further, FIG. 26 illustrates an exemplary display of another link where a text link to request to acquire the file from the relay server 3 is adopted.

Referring back to FIG. 21, the user B acquires the file by the smart device 1B by selecting the link (step S139), the smart device 1B sends a file acquisition message to the relay server 3 (step S140). FIG. 27 illustrates an exemplary file acquisition message (a request to acquire the file) in which a path, a user ID, a password, a storage ID, and so on included in the link area assembled into a query for the relay server 3. The file acquisition message having the form illustrated in FIG. 14 in advance can be sent as is.

Referring back to FIG. 21, the file storage 4 periodically acquires the message from the relay server 3 (step S141). If there is the file acquisition message, the file storage 4 acquires the file acquisition message (step S142) and acquires and sends the corresponding file (step S143).

The relay server 3 sends the file received from the file storage 4 to the smart device 1B as a request source (step S144), and the smart device 1B displays the received file (step S145). The smart device 1B retains the received file in a form of cache.

Thereafter, after the user B operates the smart device 1B to close the file (step S146), the smart device 1B deletes the cache of the file (step S147). By retaining the acquired file in the form of the cache and deletes the cache after referring it, it is possible to prevent the file from being carelessly leaked.

<Modified Example of File Share>

Figure 28:
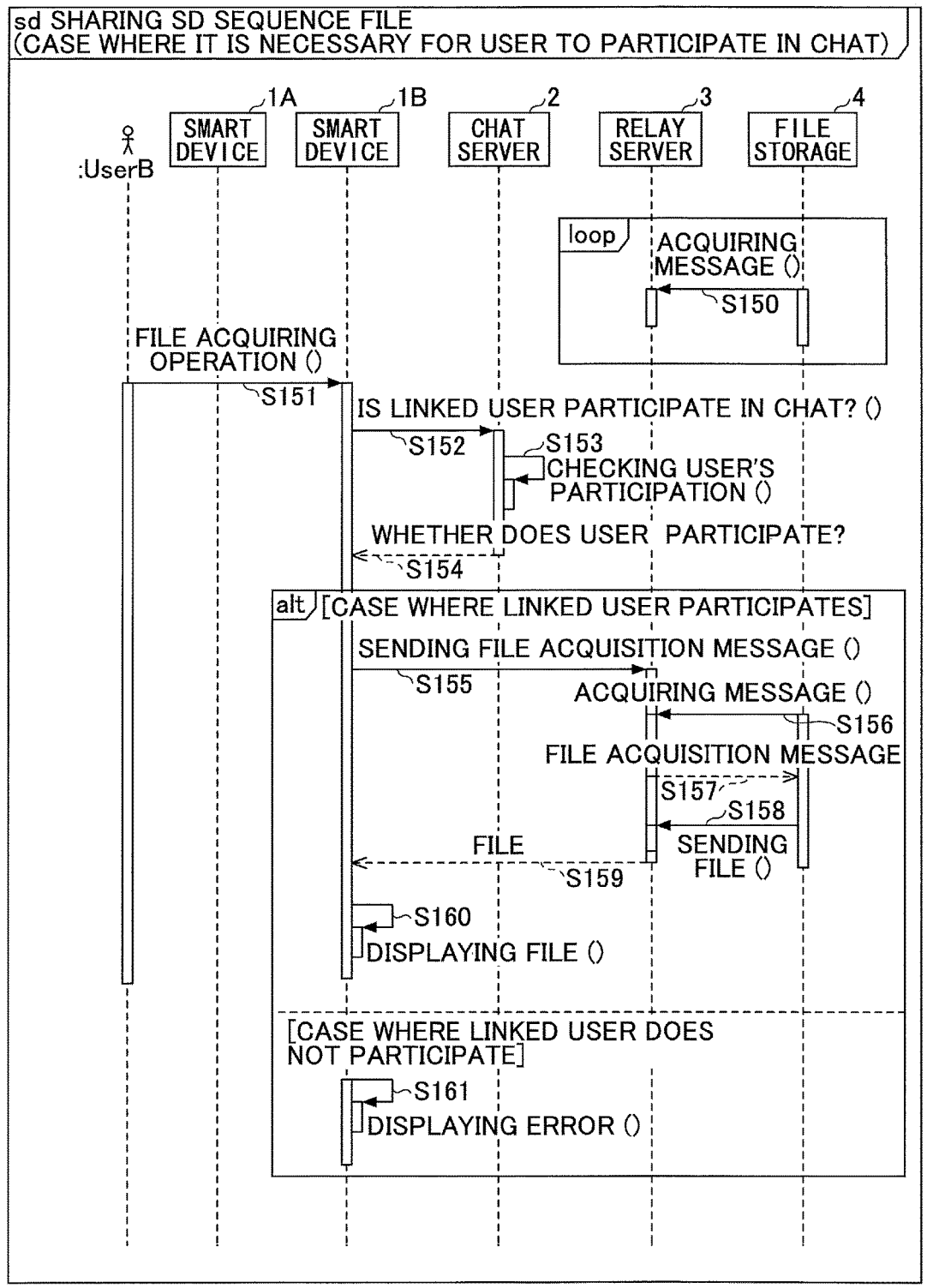
FIG. 28 is a sequence chart illustrating another exemplary process of processing the file share using the chat.

FIG. 28 is a sequence chart illustrating another exemplary process of processing the file share using the chat. In this example, only when the user performing the file share (attaching the link and sending the message along with the link), an operation of acquiring the file is permitted. With this, it is possible to prevent the file provided with the link from being unintentionally used.

Referring to FIG. 28, the file storage 4 periodically acquires a message of a request directed to the file storage 4 from the relay server 3 (step S150). If there is the request, a corresponding process is performed.

When the user B acquires the file using the smart device 1B by selecting the link (step S151), the smart device 1B inquires of the chat server 2 about whether the user providing the link is now participating the chat or not (step S152).

The chat server 2 checks the participation of the user (step S153) and responds whether the designated user participates or not (step S154).

When the user providing the link is participating the chat, the smart device 1B sends a file acquisition message to the relay server 3 (step S155).

The file storage 4 periodically acquires the message from the relay server 3 (step S156). If there is the file acquisition message, the file storage 4 acquires the file acquisition message (step S157) and acquires and sends the corresponding file (step S158).

The relay server 3 sends the file received from the file storage 4 to the smart device 1B as the request source (step S159), and the smart device 1B displays the received file (step S160).

When the user providing the link is not participating in the chat, the smart device 1B displays an error (step S161) and the file is not acquired and displayed.

<Another Exemplary System Structure>

In the above embodiment, the smart device 1 embeds the authority information in the link and acquires the file from the link through the relay server 3. In the following embodiment, the file is acquired through the chat server 2.

Figure 29:
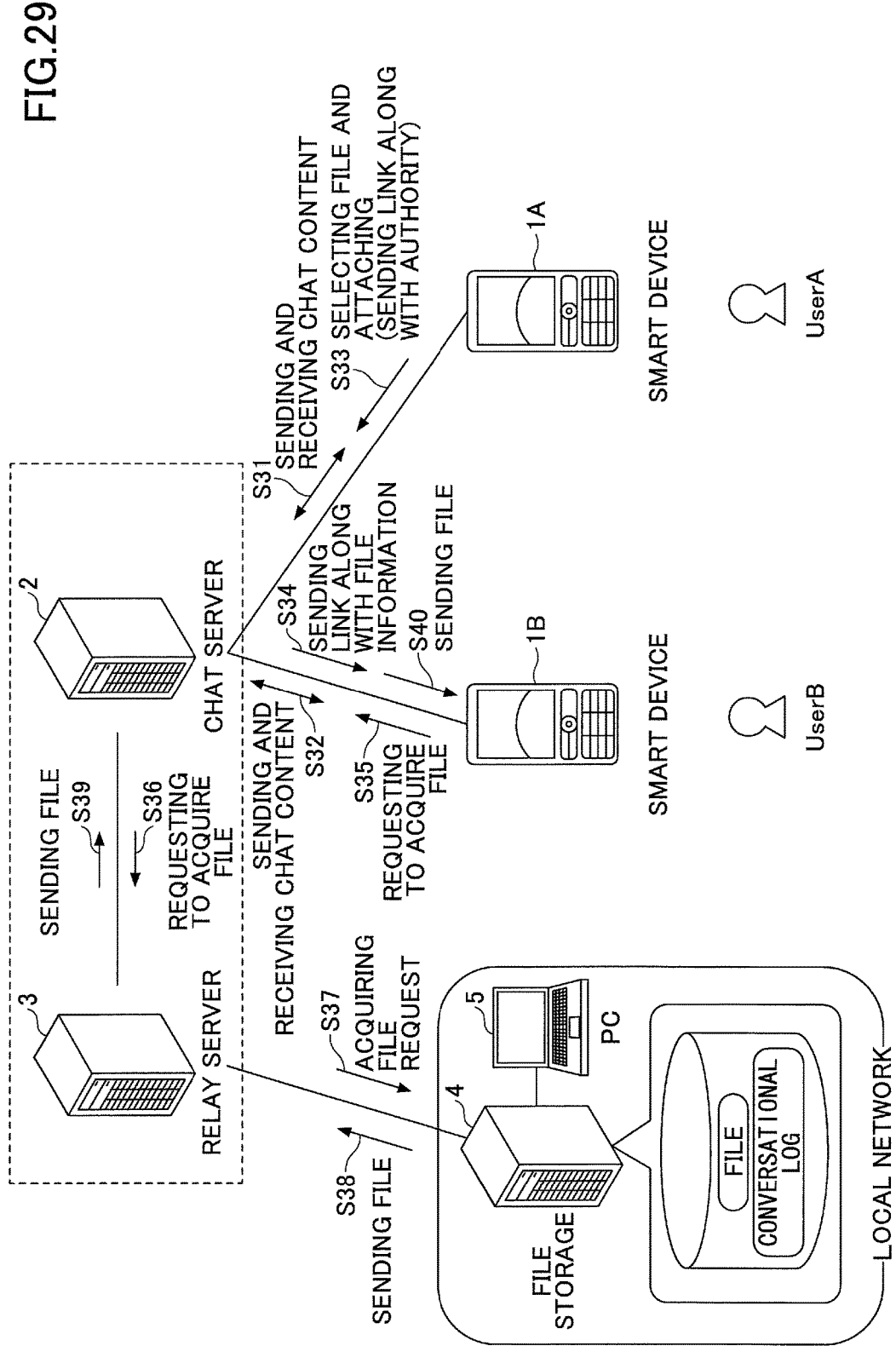
FIG. 29 illustrates another exemplary system structure.

FIG. 29 illustrates another exemplary system structure. Although the construction elements of the other system structure are similar to those of the system structure of FIG. 2, paths of the signal are different.

Referring to FIG. 29, the smart devices 1A and 1B send or receive the chat content through the chat server 2 in conformity with operations by the users A and B in steps S31 and S32.

When the user A selects a file desired to be shared using the smart device 1A and attaches a link including the authority information of the file to the chat content (step S33), the authority information is deleted by the chat server 2 (the authority information is internally retained by the chat server 2), and the link including only the file information is sent to the smart device 1B (step S33).

When the user B clicks the link on the smart device 1B, the smart device 1B requests the chat server 2 to acquire the file based on the file information of the link (step S35).

The chat server 2 adds the authority information internally retained to the request and requests the relay server 3 to acquire the file (step S36).

After this request to acquire the file is temporarily accumulated in the relay server 3, this request to acquire the file is acquired by the file storage 4 (step S37).

Because the file storage 4 accesses the relay server 3 to acquire the file retained by the user A using the authority of the user A, the file storage 4 acquires the corresponding file and sends it to the smart device 1B through the chat server 2 (steps S7 and S8).

Figure 30:
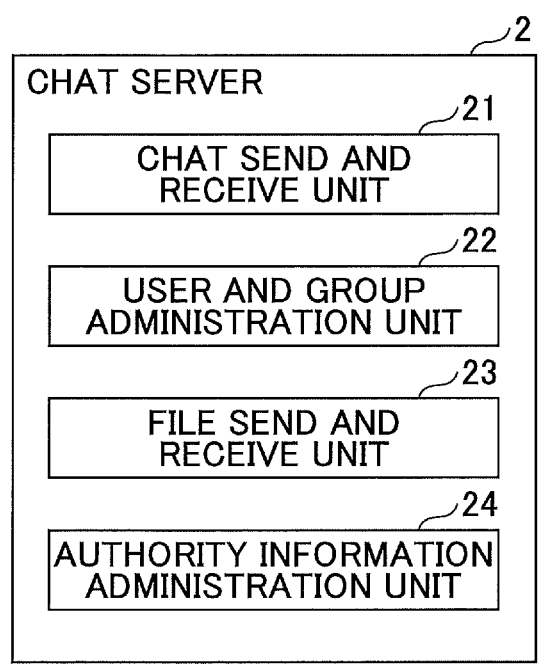
FIG. 30 illustrates an exemplary functional structure of the chat server.

FIG. 30 illustrates an exemplary functional structure of the chat server 2. In comparison with the structure illustrated in FIG. 7, the file send and receive unit 23 and the authority information administration unit 24 are added to FIG. 29. The file send and receive unit 23 has a function of sending and receiving the file to and from a device connected to the chat server 2 through the network. The authority information administration unit 24 has a function of temporarily administering the authority information which include the authority information for the file and separated from the link.

Figure 31:
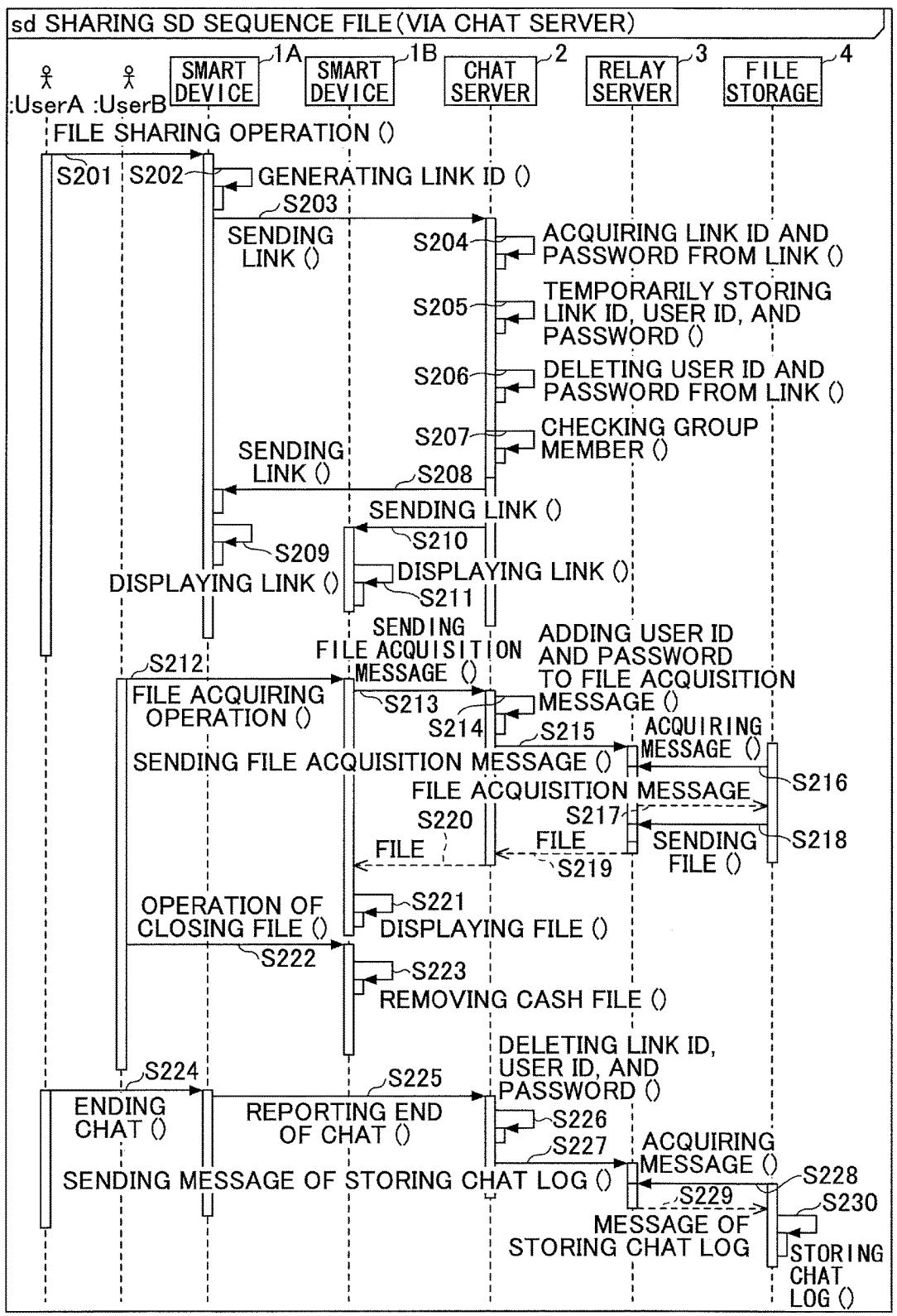
FIG. 31 is a sequence chart illustrating an exemplary process of processing the file share using the chat.

FIG. 31 is a sequence chart illustrating an exemplary process of processing the file share using the chat.

Referring to FIG. 31, when the user A wish to share a file retained in a personal folder of the user A inside the group, an operation of sharing the file is performed for the smart device 1A (step S201).

The smart device 1A generates a link which is provided to access a selected file and includes path information and authority information (step S202), and sends the link to the chat server 2 (step S203). Information included in the link is similar to that illustrated in FIG. 24.

Referring back to FIG. 31, the chat server 2 acquires a link ID, a user ID, and a password (step S204) and temporarily stores a temporarily link ID, the user ID, and the password (step S205). FIG. 32 illustrates an exemplary authority administration table, in which a link ID, a user ID, and a password acquired from the information illustrated in FIG. 24 are retained.

Referring back to FIG. 31, the chat server 2 deletes the user ID and the password from the link (step S206).

Then, the chat server 2 checks a member of the group (step S207) and sends the link to the smart device 1A (step S208). Then, the smart device 1A displays the link (step S209). It is possible to omit the sending of the message to the sending source.

Further, the chat server 2 sends the link to the smart device 1B (step S210), and the smart device 1B displays the received link (step S211).

FIG. 33 illustrates exemplary information included in the link sent from the chat server 2. In this information, the user ID (userid) and the password (password) are removed from the information illustrated in FIG. 24.

Referring back to FIG. 31, when the user B performs an operation of acquiring the file by selecting the link (step S212), the smart device 1B sends the file acquisition message to the chat server (step S213). FIG. 34 illustrates an exemplary file acquisition message sent from the smart device 1B. In comparison with the file acquisition message illustrated in FIG. 27, the user ID (userid) and the password (password) are not included.

Referring back to FIG. 31, the chat server 2 adds the user ID and the password to the file acquisition message based on the authority information temporarily accumulated in the chat server 2 (step S214). The file acquisition message after adding the user ID and the password is similar to that illustrated in FIG. 27.

Referring back to FIG. 31, the chat server 2 sends the file acquisition message to the relay server 3 (step S215).

The file storage 4 periodically acquires the message from the relay server 3 (step S216). If there is the file acquisition message, the file storage 4 acquires the file acquisition message (step S217) and acquires and sends the corresponding file (step S218).

The relay server 3 sends the file received from the file storage 4 to the chat server 2 which has required to send the file (step S219).

The chat server 2 sends the received file to the smart device 1B (step S220), and the smart device 1B displays the received file (step S221). The smart device 1B retains the received file in a form of cache.

Thereafter, after the user B operates the smart device 1B to close the file (step S222), the smart device 1B deletes the cache of the file (step S223).

Thereafter, when the user A performs an operation of ending the chat to the smart device 1A (step S224), the smart device 1A reports the end of the chat to the chat server 2 (step S225).

The chat server 2 deletes the user ID and password, which are temporarily retained (step S226) and sends a request to store the chat log to the relay server 3 (step S227).

The file storage 4 periodically acquires the message from the relay server 3 (step S228). When there is the request to store the chat log, the file storage 4 acquires the chat log of the message (step S229) and stores the acquired chat log (step S230).

In a case where the operation of acquiring the file is permitted only when the user sharing the file (the user who has provided and sent the link) participates the chat, it is checked whether the user is participating after the chat server 2 receives the file acquisition message (step S213).

When the user is participating, the process is continuously preformed. When the user is not participating, an error is returned.

Figure 35:
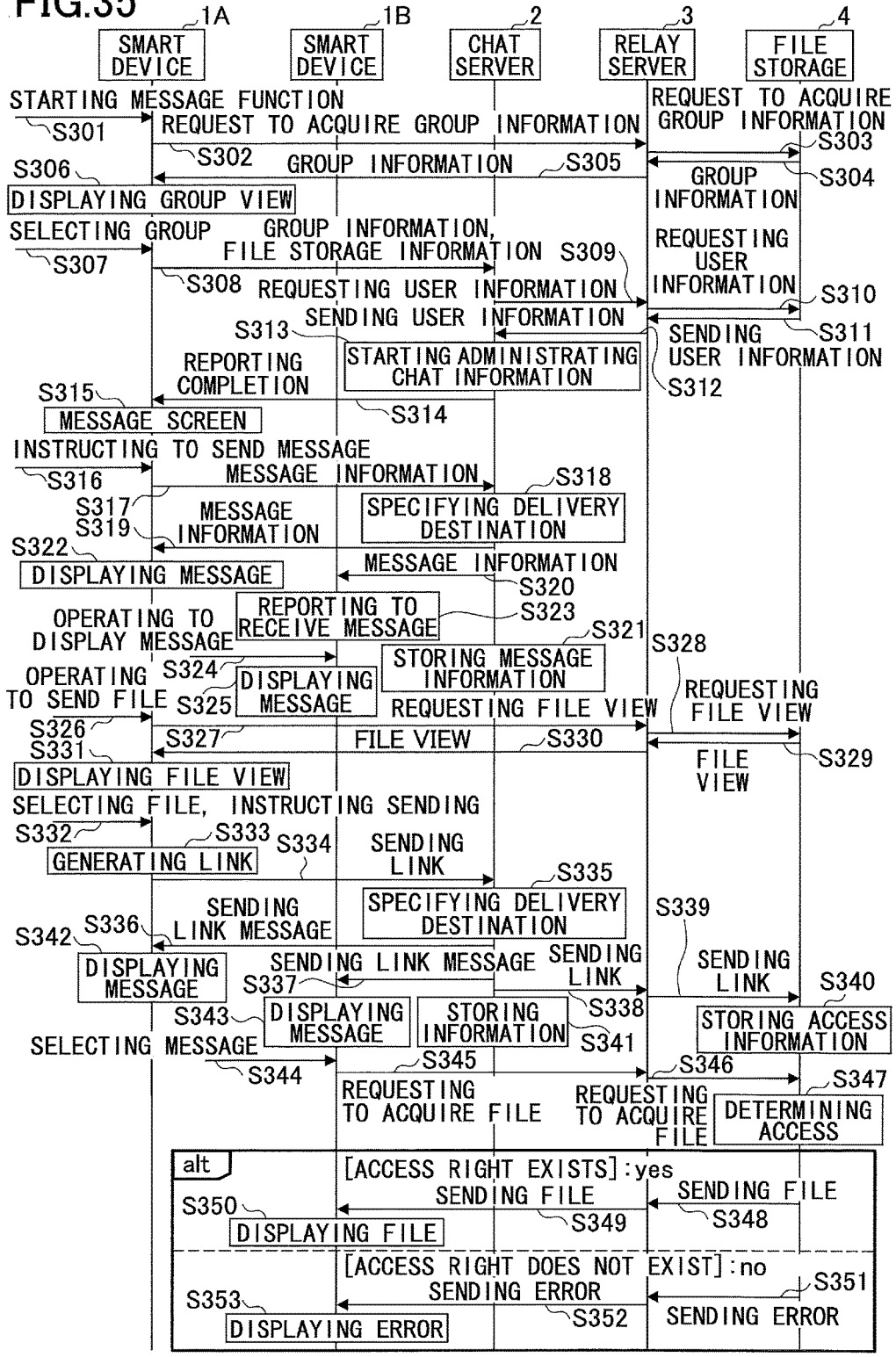
FIG. 35 is a sequence chart illustrating another exemplary process of processing the file share.

Further, another embodiment for the file share is described next. FIG. 35 is a sequence chart illustrating another exemplary process of processing the file share in the other embodiment. Within the embodiment, explanation similar to the above is omitted. The smart device 1A and the smart device 1B are already registered in the file storage, and the group to which the smart device 1A and the smart device 1B are already created.

Figure 36:
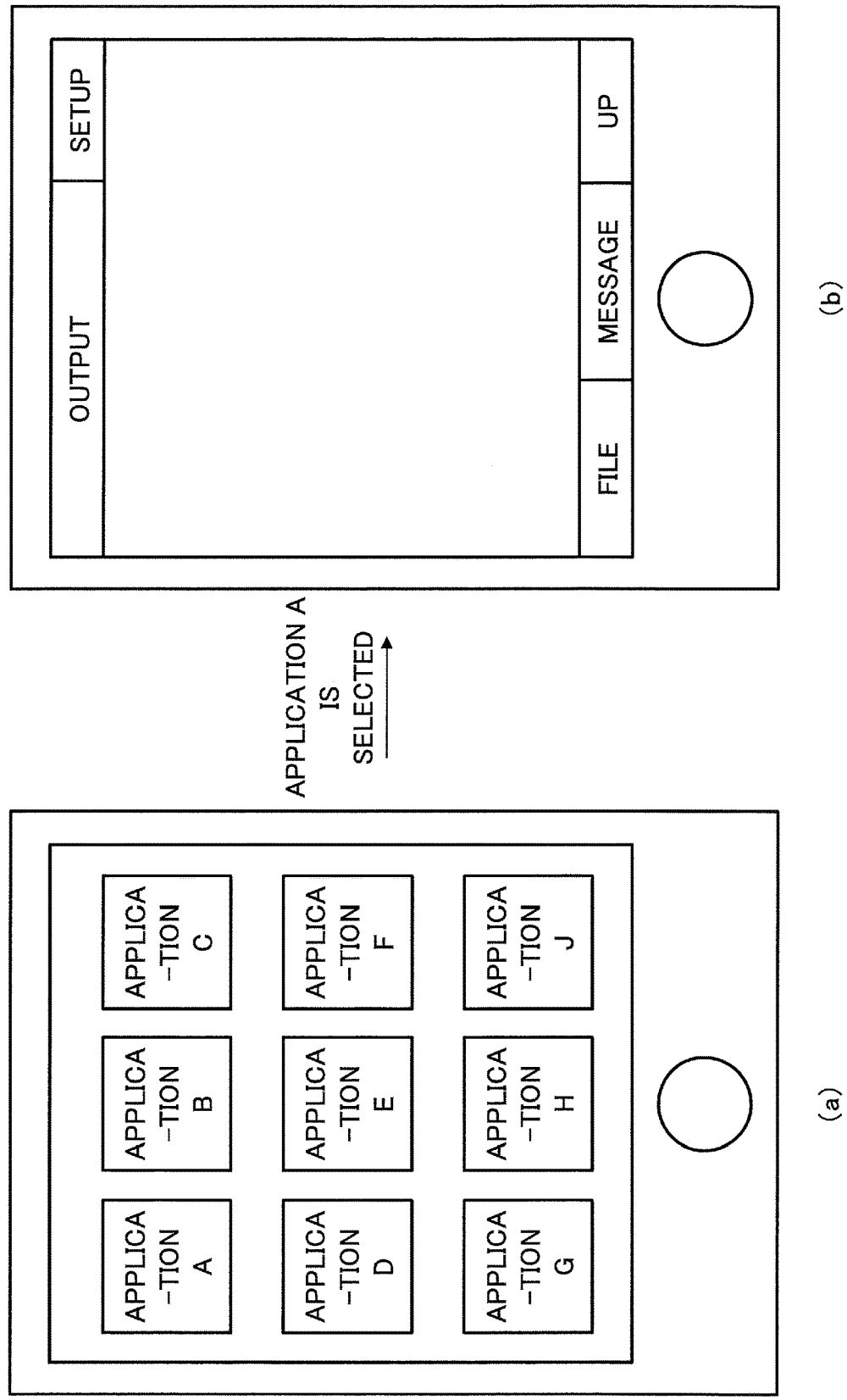
FIG. 36 illustrates an exemplary screen of the smart device.

The smart device 1A receives an instruction of starting to use a message function from the user (step S301). Referring to FIG. 36, a detailed instruction of starting to use is described. The smart device 1A displays applications included in the smart device 1A (see a left half of FIG. 36). The smart device 1A receives an instruction of activating the application (the application A in FIG. 36) for performing the process in association with the file storage 4 from the user. The smart device 1A activates the application and displays a screen of the application as illustrated in a right half of FIG. 3. The smart device 1A receives a selection of a "message button" on an application screen from the user.

Referring back to FIG. 35, the smart device 1A sends an acquisition request to acquire group information to the file storage 4 through the relay server 3 (steps S302 and S303). The process of step S303 is the same as that in the process pf the above embodiment. The file storage 4 sends the acquisition request to acquire "a request for the process to the file storage" to the relay server 3, and the relay server 3 sends "an acquisition request to acquire group information" sent from the smart device 11A to the file storage 4 sent from the smart device 1A in response to the acquisition request received by the relay server 3 from the file storage 4.

The file storage 4 sends the group information stored in the file storage 4 (see FIG. 17) to the smart device 1A through the relay server 3 in response to the acquisition request received by the relay server 3 in a manner similar to steps S304 and S305. It is preferable that the smart device 1A sends the acquisition request for the group information and the identification information (a terminal ID) of the smart device 1A, the file storage 4 refers to the user information illustrated in FIG. 15 and sends information of a group (groups 1-3 of FIG. 17) in which the user of the smart device 1A is included. Further, the identification information of the user (the user name) may be sent instead of the terminal ID.

Referring back to FIG. 35, the smart device 1A displays the view of the group illustrated in FIG. 19 (step S306). The smart device 1A receives a selection of one group out of the displayed groups (step S307). Within this embodiment, the smart device 1A receives the selection of the group 1. The smart device 1A sends the information (information for identifying the group such as the group name) of the group of which selection is received in step S307 and information for specifying the file storage 4 to the chat server 2 (step S308).

The chat server 2 specifies the file storage 4 using "information specifying the file storage 4" received from the smart device 1A, and sends an acquisition request to acquire the terminal ID of the user (here, the user A and the user B) included in the group information received by the smart device 1A to the file storage 4 through the relay server 3 (steps S309 and S310). The file storage 4 sends the terminal IDs of the user A and the user B to the chat server 2 through the relay server 3 (steps S311 and S312).

The chat server 2 starts information administration related to the message (the chat) exchanged by the smart device 1A and the smart device 1B when the terminal IDs of the user A and the user B, namely, the identification information of the smart device 1A and the smart device 1B is received from the file storage 4 (step S313). Then, the chat server 2 sends a completion report of reporting the completion of step 312 to the smart device 1A (step S314).

Figures 37, 38:
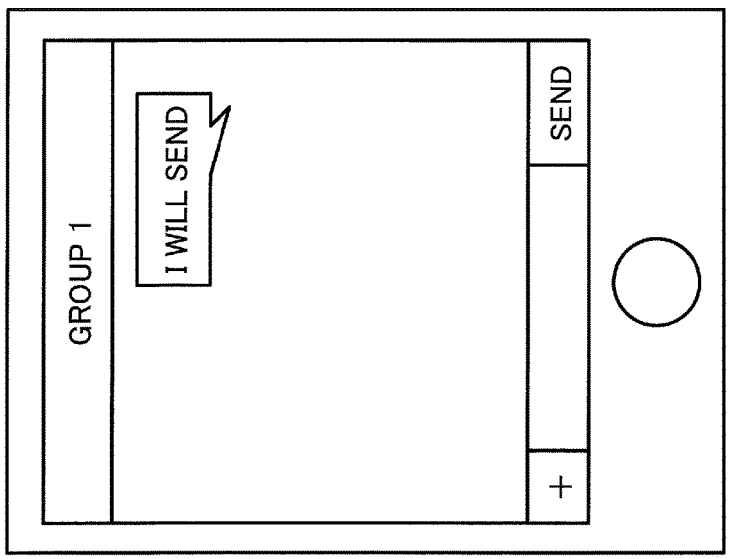
FIG. 37 illustrates an exemplary screen of the smart device.
FIG. 38 illustrates exemplary message information.

When the smart device 1A receives the completion report, the smart device 1A displays a message screen as illustrated in FIG. 37 (step S315). When the smart device 1A receives an instruction of sending the message from the user (a selection of a send button in FIG. 37)(step S316), the smart device 1A sends message information to the chat server 2 (step S317). The message information includes the content of the message to be sent (e.g., "I will send" in FIG. 37), information related to the terminal of the sending source (e.g., the terminal ID of the smart device 1A), information of the group to be sent (e.g., information for identifying the group such as the group name), and so on.

When the chat server 2 receives the message information from the smart device 1A, the chat server 2 specifies the smart devices 1A and 1B using the terminal ID received in step S312 (step S318). The chat server 2 sends the message information to the specified smart devices 1A and 1B (steps S319 and S320).

Then, the chat server 2 stores information of the message as illustrated in FIG. 38. The information of the message stored in the chat server 2 is identification information (the name, the type, and so on of the file storage 4) of the file storage 4 storing the group, identification information (a group name and so on) of the group to be sent, identification information (a user name and so on) of a sending source user, a type (a message, a file, an image, and so on) of sent information, sending data (text data, a stored place of a file, and so on), and so on.

Referring back to FIG. 35, the smart device 1A displays a sent message (step S322). Further, the smart device 1B reports receipt of the message (step S323). The smart device 1B vibrates itself or display a popup on its screen to report the receipt of the message. When the smart device 1B receives an operation of displaying the message from the user (step S324), the smart device 1B displays the received message (step S325).

Next, the smart device 1A receives an operation (e.g., a selection of a "+" button in FIG. 37) of sending the file (step S326). Then, an acquisition request to acquire information (information of a view of files) related to the file stored in the file storage 4 is sent to the file storage 4 through the relay serves 3 (steps S327 and S328). The file storage 4 sends the information related to the file stored in the file storage 4 to the smart device 1A through the relay server 3 in response to the acquisition request received by the file storage 4.

Then, the smart device uses the information related to the received file to generate and display a file view screen illustrate in FIG. 22 (step S331).

When the smart device 1A receives a selection of the file from the user and receives an instruction of sending the file of which selection (step S332), the link data as illustrated in FIG. 23 are generated (step S333). The password included in the link data is randomly generated. Then, the smart device 1A sends the generated link data to the chat server 2 (step S334).

In a manner similar to step S318, the chat server 2 specifies the sending destination of the message including the link data (step S335) and sends the message including the link data to the smart devices 1A and 1B (steps S336 and S337). Further, the chat server 2 sends the link data to the file storage 4 through the relay server 3 (steps S338 and S339). The file storage 4 stores received link data (step S340). Meanwhile, the chat server 2 stores the information related to the sent message in a manner similar to step S321 (step S341). The smart device 1A and the smart device 1B display the message as illustrated in FIG. 25 and as in steps S322 and S325 (steps S342 and S343).

Next, after the smart device 1B receives a user's selection of the message (the message including the link data) displayed in step S343 (step S344), an acquisition request (e.g., the acquisition message illustrated in FIG. 27) to acquire the file indicated by the link data is sent to the file storage 4 through the relay server 3 (steps S345 and S346).

The file storage 4 determines whether the user ID and the password which are included in the link data stored in step S340 conforms to the user ID and the password which are sent to the file storage 4 in steps S345 and S346 (step S347). When these user IDs and the passwords conform (YES in step S347), the file storage 4 sends the file indicated by the received acquisition request to the smart device 1B through the relay server 3 (steps S348 and S349). The smart device 1B displays the received file on the screen (step S350).

When these user IDs and the passwords do not conform (NO in step S347), the file storage 4 sends an error message to the smart device 1B through the relay server 3 (steps S351 and S352). The smart device 1B displays the received error message (step S353).

Within the embodiment, because the authority information (the user ID and the password) permitting the access to the file is generated for each sending file, a risk of leaking the authority information is limited and simultaneously convenience of the file share can be improved.

There is another mode in the process illustrated in FIG. 35. FIG. 39 illustrates the other mode of the message sending process illustrated in FIG. 39. Here, the user A, the user B, and a user C belong to the group and use the smart device 1A, the smart device 1B, and a smart device 1C, respectively.

The smart device 1A receives an instruction of activating the application from the user A and activates the application (steps S401 and S402). The smart device 1B receives an instruction of activating the application from the user B and activates the application (steps S403 and S404). The smart device 1 may display a login screen when the application is activated so that the user can input the user identification information (information for identifying the user such as the user ID) or the user identification information may be previously attached to the application. Thus, the smart device 1 holds the user identification information in association with the application.

The smart device 1A and the smart device 1B sends the chat server 2 a request to acquire the message to the user (the user A and the user B) identified by the user identification information using the user identification information associated with the application when the application is activated (steps S405 and S406). The chat server 2 determines whether a chat directed to the user (the user A and the user B) indicated by the acquisition request. If the chat is not received, the chat server 2 sends a result of receiving the message to report that the message does not exist to the smart device 1A and the smart device 1B (steps S407 and S408). It is preferable that the smart device 1 repeatedly requests to acquire the result of receiving the message of steps S405 to S408 while the application is activated.

Further, the file storage 4 sends the acquisition request to acquire the message directed to the group administered by the file storage in a manner similar to the smart device 1A and the smart device 1B (steps S490 and S491), and receives the message from the chat server 2 (steps S493 and S494).

Next, the smart device 1A displays the group view in receipt of the instruction of starting a message function in a manner similar to steps S301-S306 in FIG. 35 (steps S409-S414). The smart device 1A receives a selection of the group out of the displayed groups (step S415). Thereafter, a message screen of the group is displayed like step S315 of FIG. 35 (step S416).

Next, the smart device 1A receives an instruction to send the message like step S316 of FIG. 35 (step S417). Thereafter, the message information is sent to the chat server 2 (step S418). In the message information of the embodiment, information specifying the file storage is also included.

The chat server 2 acquires the information of the group include in the message information from the file storage 4 (steps S419 to S422) and determines a delivery destination of the message (step S423). Here, the chat server 2 sends the message information to the smart device 1A, the smart device 1B, and the file storage 4, which request to acquire the message (steps S424-S431). The smart devices 1A and 1B display the received message in their display device, respectively (steps S432 and S433). Meanwhile, the file storage 4 stores the received message in association with the group information (i.e., the information of the user belonging to the group) (step S434). Then, the chat server 2 deletes the message (step S435).

Meanwhile, the smart device 10 receives an instruction of activating the application and activates the application (steps S436 and S437). When the application is activated, the smart device 1C sends the acquisition request to acquire the massage to the file storage 4 and acquires the message stored in the file storage 4 (steps S438 to S441).

Although there has been described that the message is checked for only the smart device 10 in the file storage 4 when the application is activated, the embodiment is not limited thereto. The smart devices 1A and 1B may send the acquisition request. The acquisition request may be sent to the file storage not only at a time of activating the application but also at a time of receiving the instruction to start the message function or at a time of displaying the message screen (receiving the selection of the group).

As described, the message is not accumulated in the chat server 2 (i.e., a public network) but is stored in the file storage 4 (i.e., a server in a local network). Therefore, security in sending and receiving the message can be improved.

<Summarization>

As described, within the embodiments, the file can be shared with a simple operation by predetermined users.

In the description, for example, the information processing apparatus includes the file storage 4; the terminal devices includes the smart devices 1A-1C; the first terminal device includes the smart device 1A; the first user includes the UserA; the first memory unit includes the RAM 103 or the setup administration unit 16; the first acquisition unit includes the file list acquisition unit 17; the second user includes the UserB; the first reception unit includes the operation unit 12, the first send unit includes the chat send and receive unit 13; the another information processing apparatus includes the chat server 2; the receiving unit includes the chat send and receive unit 13; the second reception unit includes the operation unit 12; the second acquisition unit includes the file send and receive unit 18; the second memory unit includes the RAM 204, the HDD 208, or the user administration unit 42; the determination unit includes the user administration unit 42; and the second send unit includes the file send and receive unit 41.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

This application is based upon and claims the benefit of priority of the prior Japanese Patent Application No. 2013-245293, filed on Nov. 27, 2013, and the Japanese Patent Application No. 2014-228881, filed on Nov. 11, 2014, the entire contents of which are incorporated herein by reference.

What is claimed is:

1. An information processing system comprising:
a first information processing apparatus; and
a plurality of terminal devices,
wherein a first terminal device from among the plurality of terminal devices includes
a first processor that implements processes of
acquiring one file from among at least one file stored in the first information processing apparatus using first authentication information,
receiving, from a first user, an instruction to send the acquired one file to a second user, and
sending a message to a second information processing apparatus that is other than the first information processing apparatus and that is connected to the first terminal device upon receiving the instruction, the message including the first authentication information of the second user, which is used to acquire the acquired one file, and access information for accessing the one file, a destination of the message being the second user,
wherein a second terminal device from among the plurality of terminal devices includes
a second processor that implements processes of
receiving the message from the second information processing apparatus,
displaying the received message on a display of the second terminal device,
receiving a selection of the displayed message, which includes the first authentication information and the access information, received from the second information processing apparatus,
inquiring the second information processing apparatus of a participation status of the first user in a chat session, wherein the second processor,
acquires the one file from the first information processing apparatus, as specified by the access information included in the message, using the first authentication information included in the message, upon receiving the selection of the displayed message and in a case where the second information processing apparatus indicates, in response to the inquiry regarding the participation status of the first user, that the first user is participating in the chat session, and
displays an error indicating that the one file cannot be acquired and displayed in a case where the second information processing apparatus indicates, in response to the inquiry regarding the participation status of the first user, that the first user is not participating in the chat session, and wherein the first information processing apparatus includes
- a memory that stores the at least one file and second authentication information for accessing each of the at least one file,
- a third processor that implements processes of
  - determining whether the one file is sent to the second terminal device based on the first authentication information used by the second terminal device and the second authentication information for accessing the one file, stored in the memory, and
  - sending the one file to the second terminal device upon determination that the one file is sent to the second terminal device.

2. The information processing system according to claim 1,
wherein the first terminal device implements processes of:
- receiving an instruction to send the acquired one file to a group including information of the second user, and
- sending another message including the first authentication information upon receiving the instruction, a destination of the another message being the group.

3. The information processing system according to claim 1, the information processing system further comprising:
the second information processing apparatus,
wherein the first processor sends a report of end of sending and receiving the message to the second information processing apparatus,
wherein the second information processing apparatus includes
- a second memory that stores information of the message sent from the plurality of terminal devices, and
- a fourth processor that implements processes of
  - sending the information of the message sent from the plurality of terminal devices to the first information processing apparatus upon receiving the report of end of sending and receiving from the first terminal device, and
  - wherein the memory of the first information processing apparatus stores the information of the message sent from the second information processing apparatus.

4. The information processing system according to claim 2, the information processing system further comprising:
the second information processing apparatus including:
- a second memory storing information of the another message sent from the plurality of terminal apparatuses, and
- a fourth processor deletes the information of the another message stored in the memory when the report of end of sending and receiving is received from terminal devices of all users included in the information of the group.

5. The information processing system according to claim 1, the information processing system further comprising:
the second information processing apparatus including:
- a fourth processor that implements processes of
  - deleting the first authentication information included in the message received from the first terminal apparatus,
  - acquiring, upon receiving an acquisition request to acquire the one file using the access information included in the message, from which the first authentication information is deleted, from the second terminal device, the one file from the first information processing apparatus using the deleted first authentication information, and
  - sending the acquired one file to the second terminal device,
wherein the second processor
  - sends an acquisition request to acquire the one file to the second information processing apparatus using the access information included in the message, and
  - receives the one file sent from the second information processing apparatus upon receiving the acquisition request.

6. A method performed by an information processing system including a first information processing apparatus and a plurality of terminal devices, the method comprising:
- acquiring, by a first processor of the first terminal device, one file from among at least one file stored in the first information processing apparatus using first authentication information;
- receiving, by the first processor of the first terminal device, an instruction to send the acquired one file from a first user to a second user;
- sending, by the first processor of the first terminal device, a message to a second information processing apparatus that is other than the first information processing apparatus and that is connected to the first terminal device upon receiving the instruction, the message including the first authentication information, which is used to acquire the acquired one file, and access information for accessing the one file, a destination of the message being the second user;
- receiving, by a second processor of a second terminal device from among the plurality of terminal devices, the message from the second information processing apparatus;
- displaying, by the second processor of the second terminal device, the received message on a display of the second terminal device;
- receiving, by the second processor of the second terminal device, a selection of the displayed message, which includes the first authentication information and the access information;
- inquiring the second information processing apparatus of a participation status of the first user in a chat session, wherein the second processor,
  - acquires the one file from the first information processing apparatus, as specified by the access information included in the message, using the first authentication information included in the message, upon receiving the selection of the displayed message and in a case where the second information processing apparatus indicates, in response to the inquiry regarding the participation status of the first user, that the first user is participating in the chat session, and
  - displays an error indicating that the one filed cannot be acquired and displayed in a case where the second information processing apparatus indicates, in response to the inquiry regarding the participation status of the first user, that the first user is not participating in the chat session;
- storing, by a memory of the first information processing apparatus, the at least one file and second authentication information for accessing each of the at least one file;

determining, by a third processor of the first information processing apparatus, whether the one file is sent to the second terminal device based on the first authentication information used by the second terminal device and the second authentication information for accessing the one file, the second authentication information for accessing the one file being stored in the memory; and sending, by the third processor of the first information processing apparatus, the one file stored in the first information processing apparatus to the second terminal device upon determination by the third processor that the one file stored in the first information processing apparatus is sent to the second terminal device.

7. The information processing system according to claim 1,
wherein the first authentication information includes at least user identification information and a password for identifying a user from among the second user and another user different from the second user.

8. An information processing system comprising:
an information processing apparatus; and
a plurality of terminal devices, wherein a first terminal device from among the plurality of terminal devices includes:
  a first processor that implements processes of
    receiving an instruction to send one file from among at least one file stored in the information processing apparatus, and
    sending a message to a second information processing apparatus other than the first information processing apparatus, the second information processing apparatus being connected to the first terminal device after receiving the instruction, the message including access information for accessing the one file and first authentication information used to acquire the one file,
wherein a second terminal device from among the plurality of terminal devices includes
  a second processor that implements processes of
    receiving the message,
    displaying the received message on a display of the second terminal device,
    receiving a selection of the displayed message from among the displayed message,
    inquiring the second information processing apparatus of a participation status of the first user in a chat session, wherein the second processor,
      acquires the one file from the first information processing apparatus, as specified by the access information included in the message, using the first authentication information included in the message, upon receiving the selection of the displayed message and in a case where the second information processing apparatus indicates, in response to the inquiry regarding the participation status of the first user, that the first user is participating in the chat session, and
    displays an error indicating that the one filed cannot be acquired and displayed in a case where the second information processing apparatus indicates, in response to the inquiry regarding the participation status of the first user, that the first user is not participating in the chat session,
wherein the first information processing apparatus includes
  a third processor that implements processes of
    receiving the message,
    determining whether the one file specified by the access information is sent to the second terminal device based on the first authentication information included in the message received by the first information processing apparatus and second authentication information used by the second terminal device, and
    sending the one file to the second terminal device upon determination that the one file is sent to the second terminal device.

9. The information processing system according to claim 8, wherein
the first processor includes a memory storing the received message,
the second processer sends an acquisition request to acquire the message bound for the second terminal to the first information processing apparatus upon an event where the message sent from the first terminal is not received, and
the third processer sends the message stored in the memory to the second terminal in response to the acquisition request to acquire the message sent from the second terminal.

10. The information processing system according to claim 8,
wherein the first processor generates authentication information,
wherein the first authentication information included in the message is the generated authentication information.

* * * * *